US012721783B2

(12) United States Patent
Bulka et al.

(10) Patent No.: US 12,721,783 B2
(45) **Date of Patent: *Sep. 1, 2026**

(54) SYSTEMS AND METHODS FOR MAINTAINING ORGAN PRESSURE

(71) Applicant: Paragonix Technologies, Inc., Waltham, MA (US)

(72) Inventors: Ben Bulka, Waltham, MA (US); Arkady Shinder-Lerner, Waltham, MA (US); William Lucas Churchill, Bolton, MA (US); Michael Tajima, Waltham, MA (US); Pratik Patel, Waltham, MA (US)

(73) Assignee: Paragonix Technologies, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/268,322

(22) Filed: Jul. 14, 2025

(65) Prior Publication Data

US 2025/0339335 A1 Nov. 6, 2025

Related U.S. Application Data

(63) Continuation of application No. 18/813,810, filed on Aug. 23, 2024, now Pat. No. 12,357,533.

(Continued)

(51) Int. Cl.

*A61H 31/00* (2006.01)
*A01N 1/142* (2025.01)

(Continued)

(52) U.S. Cl.

CPC ............. *A61H 31/00* (2013.01); *A01N 1/142* (2025.01); *A01N 1/146* (2025.01); *A01N 1/148* (2025.01); *A01N 1/16* (2025.01); *A01N 1/165* (2025.01)

(58) Field of Classification Search

None

See application file for complete search history.

(56) References Cited

U.S. PATENT DOCUMENTS 3,323,872 A 6/1967 Scott
3,398,743 A 8/1968 Shalit (Continued)

FOREIGN PATENT DOCUMENTS

CA 2980782 11/2007
CA 2722615 10/2009

(Continued)

OTHER PUBLICATIONS

Briceno et al., "Back-table surgery pancreas allograft for transplantation: Implications in complications", World Journal of Transplantation, vol. 11(1):1-6 (2021).

(Continued)

*Primary Examiner* — William H. Beisner

(74) *Attorney, Agent, or Firm* — Knobbe Martens Olson and Bear, LLP

(57) ABSTRACT

Systems and methods herein generally relate to prolonging viability of bodily tissue, especially an organ, by adjusting pressure as needed to maintain a constant pressure within the organ even during external pressure fluctuations due, for example, to transportation of the organ in an airplane. The systems and methods herein can include an electronic pump that pumps gas into an organ and a mechanical pressure regulator to release gas based on organ pressure.

20 Claims, 18 Drawing Sheets

Related U.S. Application Data

(60) Provisional application No. 63/631,923, filed on Apr. 9, 2024, provisional application No. 63/578,796, filed on Aug. 25, 2023.

(51) Int. Cl.

| | |
|---|---|
| ***A01N 1/146*** | (2025.01) |
| ***A01N 1/148*** | (2025.01) |
| ***A01N 1/16*** | (2025.01) |
| ***A01N 1/165*** | (2025.01) |

(56) References Cited

U.S. PATENT DOCUMENTS 3,607,646 A 9/1971 de Roissart
3,935,065 A 1/1976 Doerig
4,336,248 A 6/1982 Bonhard et al.
4,502,295 A 3/1985 Toldeo-Pereyra
4,575,498 A 3/1986 Holmes et al.
4,643,713 A 2/1987 Viitala
4,723,974 A 2/1988 Ammerman
4,931,333 A 6/1990 Henry
4,952,409 A 8/1990 Bando et al.
4,976,708 A 12/1990 Oshiyama
5,051,352 A 9/1991 Martindale et al.
5,066,578 A 11/1991 Wikman-Coffelt
5,093,969 A 3/1992 McGuire
5,133,470 A 7/1992 Abrams et al.
5,141,847 A 8/1992 Sugimachi et al.
5,149,321 A 9/1992 Klatz et al.
5,157,930 A 10/1992 McGhee et al.
5,186,431 A 2/1993 Tamari
5,234,405 A 8/1993 Klatz et al.
RE34,387 E 9/1993 Holmes et al.
5,252,537 A 10/1993 De Winter-Scailteur
5,285,657 A 2/1994 Bacchi et al.
5,306,711 A 4/1994 Andrews
D347,894 S 6/1994 Hansen et al.
5,320,846 A 6/1994 Bistrian et al.
5,326,706 A 7/1994 Yland et al.
5,356,771 A 10/1994 O'Dell
5,362,622 A 11/1994 O'Dell et al.
5,385,821 A 1/1995 O'Dell et al.
5,395,314 A 3/1995 Klatz et al.
5,434,045 A 7/1995 Jost
5,435,142 A 7/1995 Silber
5,570,588 A 11/1996 Lowe
5,584,804 A 12/1996 Klatz et al.
5,586,438 A 12/1996 Fahy
5,599,659 A 2/1997 Brasile et al.
5,601,972 A 2/1997 Meryman
5,629,145 A 5/1997 Meryman
5,643,712 A 7/1997 Brasile
5,656,154 A 8/1997 Meryman
5,696,152 A 12/1997 Southard
5,699,793 A 12/1997 Brasile
5,702,881 A 12/1997 Brasile et al.
5,707,971 A 1/1998 Fahy
5,709,654 A 1/1998 Klatz et al.
5,712,084 A 1/1998 Osgood
5,716,378 A 2/1998 Minten
5,752,929 A 5/1998 Klatz et al.
5,827,222 A 10/1998 Klatz et al.
5,843,024 A 12/1998 Brasile
5,916,800 A 6/1999 Elizondo et al.
5,922,598 A 7/1999 Mintchev
5,963,335 A 10/1999 Boutelle
5,965,433 A 10/1999 Gardetto et al.
6,014,864 A 1/2000 Owen
6,020,575 A 2/2000 Nagle et al.
6,024,698 A 2/2000 Brasile
6,046,046 A 4/2000 Hassanein
6,060,232 A 5/2000 Von Baeyer et al.
6,100,082 A 8/2000 Hassanein
6,174,719 B1 1/2001 Elizondo et al.
6,194,137 B1 2/2001 Khirabadi et al.
6,209,343 B1 4/2001 Owen
6,241,945 B1 6/2001 Owen
6,260,360 B1 7/2001 Wheeler
6,280,925 B1 8/2001 Brockbank
6,303,388 B1 10/2001 Fahy
D453,828 S 2/2002 Brassil et al.
6,375,613 B1 4/2002 Brasile
6,381,981 B1 5/2002 Yaddgo et al.
6,406,839 B1 6/2002 Segall et al.
6,413,713 B1 7/2002 Serebrennikov
6,475,716 B1 11/2002 Seki
6,485,450 B1 11/2002 Owen
6,492,103 B1 12/2002 Taylor
D468,436 S 1/2003 Brassil et al.
D470,594 S 2/2003 Brassil et al.
6,569,615 B1 5/2003 Thatte et al.
6,582,953 B2 6/2003 Brasile
6,596,531 B2 7/2003 Campbell et al.
6,642,019 B1 11/2003 Anderson et al.
6,642,045 B1 11/2003 Brasile
6,656,380 B2 12/2003 Wood et al.
6,673,008 B1 1/2004 Thompson et al.
6,673,594 B1 1/2004 Owen et al.
6,677,150 B2 1/2004 Alford et al.
6,699,231 B1 3/2004 Sterman et al.
6,736,836 B2 5/2004 Montgomery
6,740,484 B1 5/2004 Khirabadi et al.
6,773,877 B2 8/2004 Fahy
6,794,124 B2 9/2004 Steen
6,794,182 B2 9/2004 Wolf, Jr.
6,905,871 B1 6/2005 Doorschodt et al.
6,924,267 B2 8/2005 Daemen et al.
6,948,334 B1 9/2005 Challenger
6,953,655 B1 10/2005 Hassanein et al.
6,977,140 B1 12/2005 Owen et al.
6,994,954 B2 2/2006 Taylor
6,997,688 B1 2/2006 Klein et al.
7,005,253 B2 2/2006 Polyak et al.
7,008,535 B1 3/2006 Spears et al.
7,029,839 B2 4/2006 Toledo-Pereyra et al.
D527,225 S 8/2006 Krieger et al.
D531,319 S 10/2006 Schein et al.
D531,320 S 10/2006 Garland et al.
7,157,222 B2 1/2007 Khirabadi et al.
7,176,015 B2 2/2007 Alford et al.
7,240,513 B1 7/2007 Conforti
7,270,946 B2 9/2007 Brockbank et al.
7,294,278 B2 11/2007 Spears et al.
7,316,922 B2 1/2008 Streeter
7,326,564 B2 2/2008 Lundell et al.
7,361,365 B2 4/2008 Birkett et al.
7,410,474 B1 8/2008 Friend et al.
D576,488 S 9/2008 Miota et al.
7,504,201 B2 3/2009 Taylor et al.
7,572,622 B2 8/2009 Hassanein et al.
7,651,835 B2 1/2010 Hassanein et al.
7,678,563 B2 3/2010 Wright et al.
7,691,622 B2 4/2010 Garland et al.
7,749,693 B2 7/2010 Brassil et al.
7,811,808 B2 10/2010 van der Plaats et al.
7,824,848 B2 11/2010 Owen et al.
D630,318 S 1/2011 Goodwin
7,897,327 B2 3/2011 Millis et al.
8,097,449 B2 1/2012 Garland et al.
8,152,367 B2 4/2012 Roberts et al.
D664,261 S 7/2012 Kravitz et al.
8,268,547 B2 9/2012 Owen et al.
8,268,612 B2 9/2012 Owen et al.
8,304,181 B2 11/2012 Hassanein et al.
D672,466 S 12/2012 Kravitz et al.
8,323,954 B2 12/2012 Kravitz et al.
8,361,091 B2 1/2013 Schein et al.
8,420,380 B2 4/2013 Fishman et al.
8,465,970 B2 6/2013 Hassanein et al.
D692,159 S 10/2013 Judson et al.
D692,160 S 10/2013 Judson et al.
8,613,202 B2 12/2013 Williams
D697,224 S 1/2014 Judson et al.

(56) References Cited

U.S. PATENT DOCUMENTS

| | | | |
|---|---|---|---|
| 8,685,709 | B2 | 4/2014 | Bunegin et al. |
| 8,785,116 | B2 | 7/2014 | Anderson et al. |
| 8,802,425 | B2 | 8/2014 | Ferrera |
| D713,972 | S | 9/2014 | Judson et al. |
| D714,461 | S | 9/2014 | Judson et al. |
| D714,462 | S | 9/2014 | Judson et al. |
| 8,828,034 | B2 | 9/2014 | Kravitz et al. |
| 8,828,710 | B2 | 9/2014 | Anderson et al. |
| 8,835,158 | B2 | 9/2014 | Judson et al. |
| D727,492 | S | 4/2015 | Scampoli |
| D734,868 | S | 7/2015 | Gilboa |
| 9,089,126 | B2 | 7/2015 | Faulkner et al. |
| 9,155,297 | B2 | 10/2015 | Anderson et al. |
| 9,247,728 | B2 | 2/2016 | Fishman et al. |
| 9,253,976 | B2 | 2/2016 | Anderson et al. |
| 9,259,562 | B2 | 2/2016 | Steinman et al. |
| 9,357,767 | B2 | 6/2016 | Steinman et al. |
| 9,426,979 | B2 | 8/2016 | Anderson et al. |
| D765,874 | S | 9/2016 | Judson et al. |
| 9,560,846 | B2 | 2/2017 | Anderson et al. |
| D787,696 | S | 5/2017 | Schmieta et al. |
| D791,939 | S | 7/2017 | Turturro et al. |
| 9,867,368 | B2 | 1/2018 | Anderson et al. |
| 9,910,000 | B2 | 3/2018 | Lynam et al. |
| 9,936,689 | B2 | 4/2018 | Anderson et al. |
| D819,223 | S | 5/2018 | Judson et al. |
| 10,076,112 | B2 | 9/2018 | Hassanein et al. |
| 10,085,441 | B2 | 10/2018 | Steinman et al. |
| D861,161 | S | 9/2019 | Schuessler |
| D882,077 | S | 4/2020 | Schmitt |
| D884,887 | S | 5/2020 | Kangastupa |
| D901,680 | S | 11/2020 | Guala |
| 10,918,102 | B2 | 2/2021 | Uygun et al. |
| D912,245 | S | 3/2021 | Grudo et al. |
| 11,089,775 | B2 | 8/2021 | Anderson et al. |
| 11,166,452 | B2 | 11/2021 | Judson et al. |
| 11,178,866 | B2 | 11/2021 | Anderson et al. |
| D963,194 | S | 9/2022 | Bixon et al. |
| 11,472,625 | B2 | 10/2022 | Mirzaee Kakhki |
| 11,528,903 | B1 | 12/2022 | He et al. |
| D975,273 | S | 1/2023 | Theriot |
| 11,576,371 | B2 | 2/2023 | Legallais et al. |
| 11,632,951 | B2 | 4/2023 | Collette et al. |
| 11,659,834 | B2 | 5/2023 | Judson et al. |
| D999,370 | S | 9/2023 | Wade et al. |
| D1,002,868 | S | 10/2023 | Bixon et al. |
| D1,003,434 | S | 10/2023 | Fangrow |
| 11,785,938 | B2 | 10/2023 | Clavien et al. |
| D1,016,251 | S | 2/2024 | Castriotta et al. |
| D1,031,028 | S | 6/2024 | Bornhoft et al. |
| 12,035,708 | B2 | 7/2024 | Anderson et al. |
| 12,052,985 | B2 | 8/2024 | Anderson et al. |
| 12,070,029 | B2 | 8/2024 | Collette et al. |
| 12,096,765 | B1 | 9/2024 | Anderson et al. |
| 12,121,023 | B1 | 10/2024 | Anderson et al. |
| 12,161,110 | B2 | 12/2024 | Collette et al. |
| 12,178,206 | B2 | 12/2024 | Collette et al. |
| 12,245,585 | B2 | 3/2025 | Judson et al. |
| 12,245,586 | B2 | 3/2025 | Anderson et al. |
| 12,279,610 | B2 | 4/2025 | Anderson et al. |
| 12,310,357 | B2 | 5/2025 | Collette et al. |
| 12,342,810 | B2 | 7/2025 | Anderson et al. |
| 12,357,533 | B2 | 7/2025 | Bulka et al. |
| 12,369,576 | B2 | 7/2025 | Anderson et al. |
| D1,087,382 | S | 8/2025 | Macari et al. |
| 12,410,408 | B2 | 9/2025 | Macari et al. |
| 12,485,064 | B2 | 12/2025 | Bulka et al. |
| 2001/0025191 | A1 | 9/2001 | Montgomery |
| 2002/0042131 | A1 | 4/2002 | Brockbank et al. |
| 2002/0051779 | A1 | 5/2002 | Gage et al. |
| 2002/0064768 | A1 | 5/2002 | Polyak et al. |
| 2002/0068360 | A1 | 6/2002 | Brockbank et al. |
| 2002/0115634 | A1 | 8/2002 | Polyak et al. |
| 2002/0138013 | A1 | 9/2002 | Guerrero et al. |
| 2002/0177117 | A1 | 11/2002 | Wolf |
| 2003/0022148 | A1 | 1/2003 | Seki |
| 2003/0053998 | A1 | 3/2003 | Daemen et al. |
| 2003/0054540 | A1 | 3/2003 | Alford et al. |
| 2003/0080126 | A1 | 5/2003 | Voute et al. |
| 2003/0118980 | A1 | 6/2003 | Taylor |
| 2003/0125804 | A1 | 7/2003 | Kruse et al. |
| 2003/0180704 | A1 | 9/2003 | Brockbank et al. |
| 2004/0014199 | A1 | 1/2004 | Streeter |
| 2004/0038192 | A1 | 2/2004 | Brasile |
| 2004/0038193 | A1 | 2/2004 | Brasile |
| 2004/0045314 | A1 | 3/2004 | Roth et al. |
| 2004/0058432 | A1 | 3/2004 | Owen et al. |
| 2004/0067480 | A1 | 4/2004 | Brockbank et al. |
| 2004/0111104 | A1 | 6/2004 | Schein et al. |
| 2004/0170950 | A1 | 9/2004 | Prien |
| 2004/0171138 | A1 | 9/2004 | Hassanein et al. |
| 2004/0221719 | A1 | 11/2004 | Wright et al. |
| 2004/0224298 | A1 | 11/2004 | Brassil et al. |
| 2004/0224299 | A1 | 11/2004 | Garland et al. |
| 2004/0241634 | A1 | 12/2004 | Millis et al. |
| 2004/0248281 | A1 | 12/2004 | Wright et al. |
| 2005/0100876 | A1 | 5/2005 | Khirabadi et al. |
| 2005/0147958 | A1 | 7/2005 | Hassanein et al. |
| 2005/0153271 | A1 | 7/2005 | Wenrich |
| 2005/0221269 | A1 | 10/2005 | Taylor et al. |
| 2005/0233299 | A1 | 10/2005 | Sawa et al. |
| 2005/0255442 | A1 | 11/2005 | Brassil et al. |
| 2005/0277106 | A1 | 12/2005 | Daemen et al. |
| 2006/0019388 | A1 | 1/2006 | Hutmacher et al. |
| 2006/0063142 | A1 | 3/2006 | Owen et al. |
| 2006/0121439 | A1 | 6/2006 | Baker |
| 2006/0121512 | A1 | 6/2006 | Parenteau |
| 2006/0121605 | A1 | 6/2006 | Parenteau |
| 2006/0141077 | A1 | 6/2006 | Pettersson |
| 2006/0148062 | A1 | 7/2006 | Hassanein et al. |
| 2006/0154357 | A1 | 7/2006 | Hassanein et al. |
| 2006/0154358 | A1 | 7/2006 | Hassanein et al. |
| 2006/0154359 | A1 | 7/2006 | Hassanein et al. |
| 2006/0160204 | A1 | 7/2006 | Hassanein et al. |
| 2006/0168985 | A1 | 8/2006 | Gano |
| 2006/0233986 | A1 | 10/2006 | Gutsche et al. |
| 2006/0292544 | A1 | 12/2006 | Hassanein et al. |
| 2007/0009881 | A1 | 1/2007 | Arzt et al. |
| 2007/0015131 | A1 | 1/2007 | Arzt et al. |
| 2007/0028642 | A1 | 2/2007 | Glade et al. |
| 2007/0166292 | A1 | 7/2007 | Brasile |
| 2007/0184545 | A1 | 8/2007 | Plaats et al. |
| 2007/0190636 | A1 | 8/2007 | Hassanein et al. |
| 2007/0193297 | A1 | 8/2007 | Wilson |
| 2007/0243518 | A1 | 10/2007 | Sema et al. |
| 2007/0264485 | A1 | 11/2007 | Stepanian et al. |
| 2007/0275364 | A1 | 11/2007 | Hassanein et al. |
| 2008/0017194 | A1 | 1/2008 | Hassanein et al. |
| 2008/0070229 | A1 | 3/2008 | Streeter |
| 2008/0070302 | A1 | 3/2008 | Brockbank et al. |
| 2008/0096184 | A1 | 4/2008 | Brasile |
| 2008/0145919 | A1 | 6/2008 | Franklin et al. |
| 2008/0187901 | A1 | 8/2008 | Doorschodt et al. |
| 2008/0234768 | A1 | 9/2008 | Hassanein et al. |
| 2008/0286747 | A1 | 11/2008 | Curtis et al. |
| 2008/0288399 | A1 | 11/2008 | Curtis et al. |
| 2008/0311552 | A1 | 12/2008 | Min |
| 2009/0078699 | A1 | 3/2009 | Mustafa et al. |
| 2009/0197240 | A1 | 8/2009 | Fishman et al. |
| 2009/0197241 | A1 | 8/2009 | Fishman et al. |
| 2009/0197292 | A1 | 8/2009 | Fishman et al. |
| 2009/0197324 | A1 | 8/2009 | Fishman et al. |
| 2009/0197325 | A1 | 8/2009 | Fishman et al. |
| 2009/0199904 | A1 | 8/2009 | Babbitt et al. |
| 2009/0226878 | A1 | 9/2009 | Taylor et al. |
| 2009/0240277 | A1 | 9/2009 | Connors et al. |
| 2009/0291486 | A1 | 11/2009 | Wenrich |
| 2010/0015592 | A1 | 1/2010 | Doorschodt |
| 2010/0028850 | A1 | 2/2010 | Brassil |
| 2010/0056966 | A1 | 3/2010 | Toth |
| 2010/0086907 | A1 | 4/2010 | Bunegin et al. |
| 2010/0112542 | A1 | 5/2010 | Wright et al. |
| 2010/0129784 | A1 | 5/2010 | Eichentopf et al. |
| 2010/0151559 | A1 | 6/2010 | Garland et al. |

(56) References Cited

U.S. PATENT DOCUMENTS

2010/0171802 A1 7/2010 Lee et al.
2010/0175393 A1 7/2010 Burke et al.
2010/0209902 A1 8/2010 Zal et al.
2010/0216110 A1 8/2010 Brockbank
2010/0221696 A1 9/2010 Owen et al.
2010/0233670 A1 9/2010 Gavish
2010/0234928 A1 9/2010 Rakhorst et al.
2011/0033916 A1 2/2011 Hutzenlaub et al.
2011/0039253 A1 2/2011 Owen et al.
2011/0053256 A1 3/2011 Owen et al.
2011/0059429 A1 3/2011 Owen et al.
2011/0065169 A1 3/2011 Steen et al.
2011/0129810 A1 6/2011 Owen et al.
2011/0129908 A1 6/2011 Owen et al.
2011/0136096 A1 6/2011 Hassanein et al.
2011/0173023 A1 7/2011 LeClair et al.
2011/0177487 A1 7/2011 Simsir et al.
2011/0183310 A1 7/2011 Kravitz et al.
2011/0212431 A1 9/2011 Bunegin et al.
2011/0217689 A1 9/2011 Bunegin et al.
2012/0042976 A1 2/2012 Toledo
2012/0116152 A1 5/2012 Faulkner et al.
2012/0148542 A1 6/2012 Kravitz
2012/0264104 A1 10/2012 Ferrera
2012/0266564 A1 10/2012 Haarmann et al.
2012/0301952 A1 11/2012 Anderson et al.
2012/0309078 A1 12/2012 Anderson et al.
2013/0177897 A1 7/2013 Kravitz et al.
2014/0041403 A1 2/2014 Anderson et al.
2014/0087357 A1 3/2014 Kohl et al.
2014/0140815 A1 5/2014 Shener-Irmakoglu et al.
2014/0314881 A1 10/2014 Reynolds et al.
2014/0349273 A1 11/2014 Anderson et al.
2014/0356850 A1 12/2014 Anderson et al.
2014/0356933 A1 12/2014 Anderson et al.
2014/0377880 A1 12/2014 Emburgh et al.
2015/0204598 A1 7/2015 Affleck et al.
2015/0209017 A1 7/2015 Fleming et al.
2015/0230453 A1 8/2015 Fontes et al.
2015/0373967 A1 12/2015 Anderson et al.
2016/0074234 A1 3/2016 Abichandani et al.
2016/0095310 A1 4/2016 Anderson et al.
2016/0183517 A1 6/2016 Potenziano
2016/0271015 A1 9/2016 Wengreen et al.
2016/0347532 A1 12/2016 McCormick
2016/0362240 A1 12/2016 Ferracamo, Jr.
2016/0374332 A1 12/2016 Hassanein et al.
2017/0113181 A1 4/2017 Sinstedten et al.
2018/0000068 A1 1/2018 Peralta
2018/0132478 A1 5/2018 Anderson et al.
2018/0352807 A1 12/2018 Judson et al.
2019/0038388 A1 2/2019 Schmitt et al.
2019/0175394 A1 6/2019 Kim
2019/0320649 A1 10/2019 Bunegin
2019/0374693 A1 12/2019 Kheradvar et al.
2020/0187490 A1 6/2020 Kravitz et al.
2020/0253195 A1 8/2020 Bagnato et al.
2020/0278339 A1 9/2020 Wang et al.
2020/0375178 A1 12/2020 Becker et al.
2021/0235691 A1 8/2021 Collette et al.
2021/0400952 A1 12/2021 Judson et al.
2021/0400953 A1 12/2021 Anderson et al.
2022/0007368 A1 1/2022 Tang et al.
2022/0007638 A1 1/2022 Judson et al.
2022/0256838 A1 8/2022 Anderson et al.
2022/0322658 A1* 10/2022 Keshavjee ............ A01N 1/122
2023/0059208 A1 2/2023 Shelton et al.
2023/0073834 A1 3/2023 Luke
2023/0089628 A1 3/2023 Freed
2023/0092486 A1 3/2023 Pettinato et al.
2023/0284613 A1 9/2023 Filgate et al.
2023/0284614 A1 9/2023 Anderson et al.
2023/0337659 A1 10/2023 Judson et al.
2024/0389577 A1 11/2024 Anderson et al.
2024/0415110 A1 12/2024 Anderson et al.
2025/0064052 A1 2/2025 Bulka et al.
2025/0064674 A1 2/2025 Bulka et al.
2025/0072415 A1 3/2025 Anderson et al.
2025/0072416 A1 3/2025 Anderson et al.
2025/0198984 A1 6/2025 Patel
2025/0204518 A1 6/2025 Patel
2025/0204519 A1 6/2025 Bornhoft et al.
2025/0248390 A1 8/2025 Macari et al.
2025/0302032 A1 10/2025 Anderson et al.
2025/0311717 A1 10/2025 Churchill et al.
2025/0311718 A1 10/2025 Churchill et al.
2025/0311719 A1 10/2025 Churchill et al.
2025/0318519 A1 10/2025 Judson et al.
2025/0344691 A1 11/2025 Judson et al.
2025/0344692 A1 11/2025 Collette et al.
2025/0351816 A1 11/2025 Anderson et al.
2025/0351817 A1 11/2025 Judson et al.

FOREIGN PATENT DOCUMENTS

CA 2775327 3/2011
CA 3149024 3/2021
CH 551741 7/1974
CN 100402103 C 7/2008
CN 101322861 12/2008
CN 104619169 5/2015
CN 105660603 6/2016
CN 205337358 6/2016
CN 107183005 9/2017
CN 112806351 5/2021
CN 308966732 11/2024
DE 19922310 11/2000
DE 10-2005-048625 4/2007
EP 0376763 7/1990
EP 1017274 11/2003
EP 2278874 2/2011
EP 2480069 8/2012
EP 4344544 4/2024
FR 2830077 4/2004
JP H08-169801 7/1996
JP 2000-279519 10/2000
JP 3775098 5/2006
JP 2008-120713 5/2008
KR 10-1499735 3/2015
WO WO 1991/03934 4/1991
WO WO 1994/09274 4/1994
WO WO 1995/12973 5/1995
WO WO 1996/30111 10/1996
WO WO 1997/43899 11/1997
WO WO 1999/15011 4/1999
WO WO 2000/18225 4/2000
WO WO 2000/18226 4/2000
WO WO 2000/60935 10/2000
WO WO 2001/03505 1/2001
WO WO 2001/37719 5/2001
WO WO 2001/54495 8/2001
WO WO 2001/78504 10/2001
WO WO 2001/78505 10/2001
WO WO 2001/95717 12/2001
WO WO 2002/17714 3/2002
WO WO 2002/26034 4/2002
WO WO 2002/32225 4/2002
WO WO 2002/089571 11/2002
WO WO 2004/017838 3/2004
WO WO 2004/026031 4/2004
WO WO 2004/052101 6/2004
WO WO 2004/089085 10/2004
WO WO 2004/089090 10/2004
WO WO 2004/105484 12/2004
WO WO 2004/110146 12/2004
WO WO 2005/022994 3/2005
WO WO 2005/074681 8/2005
WO WO 2005/099588 10/2005
WO WO 2006/033674 3/2006
WO WO 2006/042138 4/2006
WO WO 2006/052133 5/2006
WO WO 2006/060709 6/2006
WO WO 2006/101393 9/2006
WO WO 2007/025215 3/2007

(56) References Cited

FOREIGN PATENT DOCUMENTS

| | | | |
|---|---|---|---|
| WO | WO 2007/111495 | 10/2007 | |
| WO | WO 2007/124044 | 11/2007 | |
| WO | WO 2008/108996 | 9/2008 | |
| WO | WO 2008/144021 | 11/2008 | |
| WO | WO 2008/150587 | 12/2008 | |
| WO | WO 2009/020412 | 2/2009 | |
| WO | WO 2009/041806 | 4/2009 | |
| WO | WO 2009/099939 | 8/2009 | |
| WO | WO 2009/132018 | 10/2009 | |
| WO | WO 2010/084424 | 7/2010 | |
| WO | WO 2010/096821 | 8/2010 | |
| WO | WO 2011/038251 | 3/2011 | |
| WO | WO 2012/125782 | 9/2012 | |
| WO | WO 2013/068752 | 5/2013 | |
| WO | WO 2014/026119 | 2/2014 | |
| WO | WO 2014/026128 | 2/2014 | |
| WO | WO 2015/021513 | 2/2015 | |
| WO | WO-2015084698 A2 * | 6/2015 | ........... C12N 5/0641 |
| WO | WO 2015/126853 | 8/2015 | |
| WO | WO 2017/205967 | 12/2017 | |
| WO | WO 2017/205987 | 12/2017 | |
| WO | WO 2018/015548 | 1/2018 | |
| WO | WO 2018/112072 | 6/2018 | |
| WO | WO 2018/184100 | 10/2018 | |
| WO | WO 2018/226993 | 12/2018 | |
| WO | WO 2020/061202 | 3/2020 | |
| WO | WO 2020/252148 | 12/2020 | |
| WO | WO 2021/041181 | 3/2021 | |
| WO | WO 2021/155147 | 8/2021 | |
| WO | WO 2023/154793 | 8/2023 | |
| WO | WO 2023/215611 | 11/2023 | |
| WO | WO 2024/044385 | 2/2024 | |
| WO | WO 2024/054588 | 3/2024 | |
| WO | WO 2025/049335 | 3/2025 | |
| WO | WO 2025/166189 | 7/2025 | |
| WO | WO 2025/217060 | 10/2025 | |

OTHER PUBLICATIONS

Brown, "Chemical measurements of inulin concentrations in peritoneal dialysis solution", Clin. Chim. vol. 76:103-112 (1977).

Bunegin et al., Interstitial pO2 and high energy phosphates in the canine heart during hypothermic preservation in a new, portable, pulsatile perfusion device, from the Department of Anesthesiology University of Texas Health Science Center at San Antonio, Texas; and Center for Cardiovascular Surgery of the Republic of Lithuania, Vilnius, Lithuania, vol. 3(3):1-6 (1998).

Bunegin et al., The Application of Fluidics Technology for perfusion of adult, human sized, canine hearts, from the Department of Anesthesiology, Health Science Center at San Antonio, University of Texas, vol. 8(1/2):73-78 (2003).

Bunegin et al., "The Application of Fluidics Technology for Organ Preservation", Biomedical Instrumentation & Technology, Mar./Apr. 2004, pp. 155-164.

Calhoon et al., "Twelve-Hour Canine Heart Preservation With a Simple, Portable Hypothermic Organ Perfusion Device", r\nn Thorac Surg 1996:62:91-93.

Ceulemans et al., "Combined liver and lung transplantation", American Journal of Transplantation, vol. 14(10):2412-2416 (2014).

Cypel et al., "Extracorporeal lung perfusion", Current Opinion in Organ Transplantation, vol. 21(3):329-335 (2016).

De Perrot, "Lung preservation, Seminars in Thoracic and Cardiovascular Surgery", Saunders, Philadelphia, PA vol. 16(4):300-308 (2004).

Galasso, "Inactivating hepatits C virus in donor lungs using light therapies during normothermic ex vivo lung perfusion", Nature Communications, vol. 10(481):1-12 (2019).

Interview with CEO of Paragonix, posted at tactical-medicine.com, posting date Jul. 12, 2022, retrieved Nov. 14, 2023, online, https://tactical-medicine.com/blogs/news/improving-transplant-survival-with-organ-preservation-tech-interview-with-dr-anderson-ceo-of-paragonix (Year: 2022).

Irish Medicines Board "Viaspan" Summary of Product Characteristics available online at <https://www.hpra.ie/img/ _. / JcenseSPC_PA0002-075-001_21112012111041.pdf>, Nov. 21, 2012 (6 Pages).

Naoum, "Xometry: Everything you need to know about acrylic and its uses", published May 4, 2022, accessed on Jan. 14, 2025, at https://www.xometry.com/resources/materials/acrylic-pmma/#:~: text=Acrylic%20is%20a%20type%20of,worst%20and%20dysfunctional%20at%20best (2022).

Organ Recovery Systems, Inc., LifePort Brochure, www.organ-recovery.com retrieved Aug. 29, 2012 (12 pages).

Paragonix SherpaPak, posted at .mmcts.org, posting date Jun. 16, 2021, retrieved Nov. 14, 2023, online, https://mmcts.org/utuorial/1657 (Year: 2021).

Raredon et al., "Biomimetic culture reactor for whole lung engineering", BioResearch, vol. 5.1:72-83 (2016).

Steinbrook, The New England Journal of Medicine, "Organ Donation after Cardiac Death", Jul. 9, 2007 (5 pages).

T'Hart, "New solutions in organ preservation", Transplantation Reviews, vol. 16:131-141 (2006).

Tolstykh et al., "Novel portable hypothermic pulsatile perfusion preservation technology: Improved viability and function of rodent and canine kidneys", Ann Transplant, 2010; 15(3):1-9.

Tolstykh et al., "Perfusion preservation of rodent kidneys in a portable preservation device based on fuidics technology", Transplantation, vol. 73(9):1508-1526 (2002).

Vries et al., "Systms engineering the organ preservation process for transplantation", Current Opinion in Biotechnology, vol. 58:192-201 (2019).

Wandall et al., "Galactosylation does not prevent the rapid clearance of long-term 40C-stored platelets", Blood, vol. 11(6):3249-3256 (2008).

Watanabe et al., "Ex vivo lung perfusion", J Thorac Dis, vol. 13(11):6602-6617 (2021).

Weegman et al., "Continuous Real-time Viability Assessment of Kidneys Based on Oxygen Consumption", Transplant Proc. 2010; 42(6):2020-2023.

International Search Report and Written Opinion in application no. PCT/US2024/043714, mailed on Jan. 28, 2025, in 21 pages.

Chi et al., "The Development of a portable ECG monitor based on DSP", Physics Procedia, vol. 33:765-774 (2012).

Kidney Transport, retrieved online on Feb. 27, 2025, at: https://fluctus.nl/en/portfolio/kidney-assist/, publication date unknown.

Yufer et al., "A tissue impendance measurement chip for myocardial ischemia detection", IEEE Transactions on Circuits and Systems-I:Regular Papers, vol. 52(12):2620-2628 (2005).

Boteon et al., "Combined hypothermic and normothermic machine perfusion improves functional recovery of extended criteria donor livers", Liver Transplantation, vol. 24(12): 1699-1715 (2018).

Ma et al., "Application and research progress of phase change materials in biomedical field", Biomater. Sci. vol. 9:5762-5780 (2021).

Michel et al., "Innovative cold storage of donor organs using the Paragonix Sherpa Pak™ devices", Heart Lung and Vessels, vol. 7(3):246-255 (2015) XP093292267, retrieved from the internet on Jul. 2, 2025 at: https://pmc.ncbi.nlm.nih.gov/articles/PMC4593023/pdf/hlv-07-246.pdf.

Van Leeuwen et al., "Sequential hypothermic and normothermic machine perfusion enables safe transplantation of high-risk donor livers", American Journal of Transplantation, vol. 22(6):1658-1670 (2022).

* cited by examiner

SYSTEMS AND METHODS FOR MAINTAINING ORGAN PRESSURE

INCORPORATION BY REFERENCE TO ANY PRIORITY APPLICATIONS

Any and all applications for which a foreign or domestic priority claim is identified in the Application Data Sheet as filed with the present application are hereby incorporated in their entireties by reference under 37 CFR 1.57. In particular, this application is a continuation of U.S. Non-Provisional application Ser. No. 18/813,810, filed Aug. 23, 2024, which claims priority to the U.S. Provisional Application 63/578,796, filed Aug. 25, 2023, and U.S. Provisional Application 63/631,923, filed Apr. 9, 2024, which are incorporated by reference herein in its entirety.

TECHNICAL FIELD

The disclosure relates to systems and methods for the storage and transportation of bodily tissue.

BACKGROUND

The current invention generally relates to devices, systems, and methods for extracorporeal preservation of bodily tissue. Extracorporeal preservation of bodily tissue is essential in transplant procedures so that donor tissue can be transported to a recipient in a remote location. In order to provide the best graft survival rates, donor tissues must be matched to appropriate recipients. Because of the sudden nature of most tissue donation events, appropriate recipients must be rapidly located and must be within a limited geographic area of the donor. Time limitations on the extracorporeal viability of donor tissue can lead to less than ideal tissue matching and, worse, wasted donor tissue. Prolonging the viability of donor tissue can allow for better matching between donor tissue and recipients and, in turn, can increase graft survival rates and increase availability of donor tissue to the growing waitlists of individuals in need of transplants.

The most prevalent current technique for preserving a bodily tissue for transplantation is static cold storage. While hypothermic temperatures decrease the oxygen demand of the bodily tissue, the tissue's viability is still time-limited by insufficient oxygen levels to meet the tissue's decreased metabolic needs. Another known technique for preserving a bodily tissue for transplantation includes the use of hypothermic perfusion devices that can perfuse the tissue with oxygenated perfusate, supplying additional oxygen to the tissue's cells and prolonging tissue viability. The portability of such known devices is limited, however, because such known devices are large and require a significant volume of compressed gas and electrical power. Furthermore, such known devices are very complex, which can lead to increased manufacturing costs and higher failure rates.

An additional limitation of hypothermic storage is the tendency to cause edema, or the accumulation of fluid within the bodily tissue. The level of edema generally increases with the length of hypothermic storage, providing another limitation on the amount of time that a tissue can be stored and remain viable.

Because of the time limitations on tissue viability, even given modern hypothermic storage and perfusion techniques, tissue and organs are often transported via air and, accordingly, subjected to pressure changes associated with changes in altitude.

SUMMARY OF THE INVENTION

Systems and methods of the invention are directed to increasing donor tissue viability during and after storage and transport. In particular, systems and methods relate to storage and transport of lungs that accommodate pressure changes. As noted above, tissue transported by air may be subjected to changes in pressure associated with increases and decreases in altitude during flight. While changes in pressure may affect any tissue being transported, they can be particularly harmful to lung tissue. In typical donor lung retrieval and preparation, the donor lung is inflated with air and the trachea or bronchus is stapled to hold the air in the partially inflated lung and to keep preservation fluid out of the airways during storage and transport. Unfortunately, this inflation occurs on the ground and, once subjected to decreases in air pressure from flights at high altitude, the pressure differential between the sealed lung airways and surrounding preservation fluid and air can result in over inflation of the lung and damage to the tissue including rupturing of the alveoli or other air passages. Accordingly systems and methods of the invention may be used to monitor and maintain a relatively constant pressure within donor lungs during transport and storage while maintaining a desired level of inflation. Systems and methods can accomplish those tasks while maintaining separation between the non-sterile airway environment and the sterilized outer tissue surfaces and preservation fluid to help prevent infection of the donor tissue or the transplant recipient.

In order to maintain a desired pressure differential, systems and methods of the invention may use a combination of an electronic pump and a mechanical pressure regulator to release and/or capture excess pressure within the lungs and/or to re-pressurize the lungs. An electronic pump may be connected to a regulator to supply air for the lungs through connected tubing and a pressure relief valve that can maintain a desired lung pressure (e.g., 10-15 cm $H_2O$, 12-15 cm $H_2O$).

In certain embodiments, the organ is placed in one or more sterilized containers (e.g., bags) to provide a sterile environment for the organ and a barrier between the organ and the storage device and fluids. In embodiments, the organ or tissue is placed within three nested bags, each sealed to the external environment. The bags may include nested filters allowing connection of a gas or fluid line from the external environment into the inside of the inner-most bag. Gas or other fluids may be introduced into the organ through such a connection. In certain embodiments, a single filtered connector may be used where each of the nested bags is secured to the single filter in progressive locations. Inter-bag connectors may include one or more filters to filter gasses being introduced into the organ as well as to allow any gas lost from the tissue into the bag to escape. Allowing lost gas to escape can avoid damaging air bubbles within the fluid as well as maintaining tissue contact with any preservation fluid in which the tissue may be submerged. The use of one-way valves may help ensure that gasses can escape from the storage bags but not enter through the vents.

The gas provided to the lungs to maintain a desired pressure can be treated in various ways to further aid in tissue preservation. For example, the gas may be cooled and/or humidified to maintain a desired preservation temperature and avoid organ desiccation. In certain embodiments, the organ may be slightly compressed (e.g., fitted with an elastic sleeve) in order to mimic the natural pleural pressure on the tissue. Such static pressure, in combination with the compressed gas systems of the invention can be used to create a pulsatile or cyclic flow of gas into and out of the lung. That pulsatile flow can be used in combination with gas cooling and/or humidifying for better maintenance of tissue temperature and humidity as well as providing oxygen to the tissue.

Where humidity is added to the gas entering the tissue, various active compounds can be added to the evaporative fluid in order to treat the organ. For example, antimicrobial or any other soluble compound can be introduced via the wetting fluid used to humidify the air entering the tissue.

Cooling can be accomplished by storing the gas source within a cooled space such as the organ transport container itself. In various embodiments, the transport container can include cooling or heating elements to control temperature therein. The temperature of gas entering the organ can be controlled, in certain embodiments, by passing the air lines through a heating or cooling element.

Similarly, gas used to initially inflate a donor lung at the donor site may be conditioned via any of the above methods. For example, cooling the air used to inflate a donor lung can aid in bringing the temperature of the organ down to the appropriate temperature for storage and transport, complementing the external cooling afforded by a cooled storage space and cooled preservation fluid. Providing cooled air to the smallest airways of the lung can help prevent damage and deterioration of those delicate structures during storage and transportation.

In various embodiments, pleural pressure can be emulated by inflating a cavity in or between one or more of the storage bags surrounding the tissue with a gas or liquid. The external pressure may be static with internal pulsatile flow driven by the internally-delivered compressed gas. In other embodiments, the external pressure may be pulsatile itself with fluid being added to and removed from the tissue-surrounding cavities. In certain embodiments, the compressive fluid used to inflate the cavities surrounding the tissue may be compressed gas from the same source used to pressurize the tissue as described above.

Another drawback of current lung transport techniques is that lungs are typically transported horizontally on a flat surface or on a bed of crushed ice. Both techniques are far different from the geometry and orientation of the lung's anatomical home. By resting the lung horizontally, gravity can crush or damage the bottom-most airways. A rough bed of crushed ice only complicates the issue. Accordingly, systems and methods of the invention may include replicating the geometry of the chest cavity and/or the orientation of the lung therein during transport and storage of donor lungs. In certain embodiments, a lung or pair of lungs may be placed horizontally on a smooth surface with a raised central saddle portion to replicate the spine. Alternatively, a lung or pair of lungs may be suspended in an upright position similar to the orientation of the lung in a standing human body. In such instances, the lung or lungs may be suspended by the trachea or bronchus which may be secured to a support tube in fluid communication with, for example, an electronic pump as described above. In certain embodiments, a rack and tray system may be used to provide a smooth surface for supporting the bottom of the organ and to further provide a variety of mounting holes to position supporting rods in various configurations. The supporting rods can be used to provide configurable lateral support to the organ.

Systems and methods of the invention have application in both static cold storage devices and hypothermic machine perfusion devices. In certain embodiments, hypothermic machine perfusion devices are configured to oxygenate and perfuse a bodily tissue for extracorporeal preservation of the bodily tissue. In lung applications, the perfusate may be pumped through the lung's vasculature and kept separate from the electronic pump air system described above. The perfusion apparatuses can include a pneumatic system, a pumping chamber, and an organ chamber. The pneumatic system may be configured for the controlled delivery of fluid to and from the pumping chamber based on a predetermined control scheme. The predetermined control scheme can be, for example, a time-based control scheme or a pressure-based control scheme. The pumping chamber is configured to diffuse a gas into a perfusate and to generate a pulse wave for moving the perfusate through a bodily tissue. The organ chamber is configured to receive the bodily tissue and the perfusate. The organ chamber is configured to substantially automatically purge excess fluid from the organ chamber to the pumping chamber. The pumping chamber may be configured to substantially automatically purge excess fluid from the pumping chamber to an area external to the apparatus.

In some embodiments, the system herein can include an organ adapter configured to seal with a lumen of an organ; a manifold in fluid communication with the organ adapter; an electronic pump configured to pump gas to the manifold; and a pressure regulator in fluid communication with the manifold, the pressure regulator configured to release gas from the manifold at a gas release rate, wherein the pressure regulator is configured to increase the gas release rate when organ pressure is above a high pressure threshold, and wherein the pressure regulator is configured to decrease the gas release rate when organ pressure is below a low pressure threshold.

In some embodiments, the organ is a lung and the lumen of the organ is selected from the group consisting of a trachea or bronchus of the lung. In some embodiments, the system can include one or more containers operable to receive the organ and form a sealed environment around the organ, the one or more containers including a connector to facilitate fluid communication between the organ adapter within the one or more containers and the manifold external to the one or more containers. In some embodiments, the one or more containers are nested within each other. In some embodiments, the system can include one or more sensors configured to measure a parameter of the organ. In some embodiments, the parameter is selected from the group consisting of temperature and pressure. In some embodiments, the system can include a cooling element. In some embodiments, the cooling element is configured to cool gas traveling to the lumen of the organ. In some embodiments, the system can include a humidifying element configured to humidify gas traveling to the lumen of the organ. In some embodiments, the system can include a compressive sleeve operable to compress the organ. In some embodiments, the system can include one or more pouches of phase change material (PCM) for surrounding and cooling the one or more containers. In some embodiments, the electronic pump pumps gas into the manifold at a constant rate. In some embodiments, the system can include a pressure sensor configured to measure organ pressure. In some embodiments, the electronic pump is configured to pump gas from an organ chamber to the manifold. In some embodiments, the high pressure threshold is 15 cmH2O. In some embodiments, the low pressure threshold is 10 cmH2O. In some embodiments, the low pressure threshold is 12 cmH2O. In some embodiments, the system can include an outer container configured to be removed without disconnecting the organ adapter. In some embodiments, the system can include a suspension mechanism to suspend the organ upright. In some embodiments, the phase change material (PCM) is engineered to have a temperature between 2-10° C. In some embodiments, the phase change material (PCM) is arranged in recesses. In some embodiments, the system can include a pressure management module. In some embodiments, the electronic pump is configured to pump gas from an external environment to the manifold. In some embodiments, the pressure regulator is configured to pump gas to an external environment from the manifold. In some embodiments, the pressure regulator is configured to pump gas to an organ chamber from the manifold. In some embodiments, the system can include a datalogger configured to log information from the one or more sensors. In some embodiments, the techniques described herein relate to a system and 26, further including an alarm when the parameter is above or below a threshold. In some embodiments, the system can include a battery pack configured to charge the electronic pump. In some embodiments, the system can include a sterilizing filter. In some embodiments, the electronic pump is configured to be controlled by a user.

In some embodiments, the method herein can include providing an organ transport container including an organ adapter, a pressure regulator, and a manifold, wherein the manifold is in fluid communication with the pressure regulator and the organ adapter; sealing the organ adapter to a lumen of an organ; pumping, using an electronic pump, gas to the manifold; releasing, using the pressure regulator, gas from the manifold at a gas release rate; increasing, using the pressure regulator, a gas release rate when organ pressure is above a high pressure threshold, and decreasing, using the pressure regulator, the gas release rate when organ pressure is below a low pressure threshold.

In some embodiments, the organ is a lung and the lumen of the organ is selected from the group consisting of a trachea or bronchus of the lung. In some embodiments, the method can include receiving the organ in one or more containers and forming a sealed environment around the organ, the one or more containers including a connector to facilitate fluid communication between the organ adapter within the one or more containers and the manifold external to the one or more containers. In some embodiments, the one or more containers are nested within each other. In some embodiments, the method can include measuring a parameter of the organ using one or more sensors. In some embodiments, the parameter is selected from the group consisting of temperature and pressure. In some embodiments, the method can include cooling the organ using a cooling element. In some embodiments, the cooling element is configured to cool gas traveling to the lumen of the organ. In some embodiments, the method can include humidifying gas traveling to the lumen of the organ using a humidifying element. In some embodiments, the method can include compressing the organ using a compressive sleeve. In some embodiments, the method can include surrounding and cooling the one or more containers using one or more pouches of phase change material (PCM). In some embodiments, the electronic pump pumps gas into the manifold at a constant rate. In some embodiments, the method can include measuring organ pressure using a pressure sensor. In some embodiments, the electronic pump is configured to pump gas from an organ chamber to the manifold. In some embodiments, the high pressure threshold is 15 cmH2O. In some embodiments, the low pressure threshold is 10 cmH2O. In some embodiments, the low pressure threshold is 12 cmH2O. In some embodiments, the method can include removing an outer container without disconnecting the organ adapter. In some embodiments, the method can include suspending the organ upright using a suspension mechanism. In some embodiments, the phase change material (PCM) is engineered to have a temperature between 2-10° C. In some embodiments, the phase change material (PCM) is arranged in recesses. In some embodiments, the organ transport container further includes a pressure management module. In some embodiments, the electronic pump is configured to pump gas from an external environment to the manifold. In some embodiments, the pressure regulator is configured to pump gas to an external environment from the manifold. In some embodiments, the pressure regulator is configured to pump gas to an organ chamber from the manifold. In some embodiments, the method can include logging information from the one or more sensors with a datalogger. In some embodiments, the techniques described herein relate to a method and 56, further including activating an alarm when the parameter is above or below a threshold. In some embodiments, the method can include charging the electronic pump using a battery pack. In some embodiments, the method can include filtering the gas using a sterilizing filter. In some embodiments, the electronic pump is configured to be controlled by a user.

In some embodiments, the system herein can include a transport container configured to receive a lung; a lung adapter configured to seal with an airway of the lung; one or more sensors configured to measure a gas concentration in the lung; a gas source configured to be in fluid communication with the lung adapter; and a pump configured to pump gas from the gas source to the lung adapter and the airway of the lung.

In some embodiments, the one or more sensors are configured to measure an oxygen concentration. In some embodiments, the pump is configured to pump oxygen to the airway of the lung when the oxygen concentration is below an oxygen threshold. In some embodiments, the oxygen threshold is 20%. In some embodiments, the one or more sensors are configured to measure a carbon dioxide concentration. In some embodiments, the pump is configured to pump oxygen to the airway of the lung when the carbon dioxide concentration is above a carbon dioxide threshold. In some embodiments, the pump is configured to remove carbon dioxide from the airway of the lung when the carbon dioxide concentration is above a carbon dioxide threshold. In some embodiments, the carbon dioxide threshold is 1%. In some embodiments, the system can include a port connected to the lung adapter including a bronchoscopy component. In some embodiments, the system can include a port connected to the lung adapter including a mucus removal component configured to remove mucus secretion from the airway of the lung. In some embodiments, the system can include a port connected to the lung adapter including a delivery component configured to deliver at least one diagnostic agent to the airway of the lung. In some embodiments, the system can include a port connected to the lung adapter including a delivery component configured to deliver at least one therapeutic agent to the airway of the lung. In some embodiments, the pump is configured to deliver nitric oxide to the airway of the lung. In some embodiments, the one or more sensors is configured to sample a gas concentration in a trachea of the lung. In some embodiments, the one or more sensors is configured to sample a gas concentration in one or more lobes of the lung. In some embodiments, the one or more sensors is configured to sample a gas concentration in preservation solution in the transport container. In some embodiments, the system can include cooling material disposed in the transport container.

In some embodiments, the methods herein can include providing a transport container configured to receive a lung; sealing an airway of the lung to a lung adapter of the transport container; measuring, using one or more sensors, an oxygen concentration in the lung; and delivering, using a pump, oxygen to the lung through the lung adapter when the oxygen concentration is below an oxygen threshold.

In some embodiments, measuring the oxygen concentration of the lung includes measuring the oxygen concentration of the lung at multiple points in time during preservation of the lung. In some embodiments, the oxygen threshold is 20%. In some embodiments, the method can include inputting the oxygen threshold.

In some embodiments, the methods herein can include providing a transport container configured to receive a lung; sealing an airway of the lung to a lung adapter of the transport container; measuring, using one or more sensors, a carbon dioxide concentration in the lung; and removing, using a pump, carbon dioxide from the lung through the lung adapter when the carbon dioxide concentration is above a carbon dioxide threshold.

In some embodiments, measuring the carbon dioxide concentration of the lung includes measuring the carbon dioxide concentration of the lung at multiple points in time during preservation of the lung. In some embodiments, the carbon dioxide threshold is 1%. In some embodiments, the method can include inputting the carbon dioxide threshold.

In some embodiments, the methods herein can include providing a transport container configured to receive a lung; sealing an airway of the lung to a lung adapter of the transport container; measuring, using one or more sensors, an oxygen concentration in the lung during hypothermic preservation; and determining viability of the lung for transplantation based on the oxygen concentration in the lung.

In some embodiments, measuring the oxygen concentration of the lung includes measuring the oxygen concentration of the lung at multiple points in time during preservation of the lung. In some embodiments, the method can include determining viability of the lung for transplantation based on a change in oxygen concentration during preservation of the lung.

In some embodiments, the methods herein can include placing a lung in a transport container; delivering, using one or more electrodes, electricity to the lung; measuring, using the one or more electrodes, voltage of the lung during hypothermic preservation; determining impedance of the lung based on the voltage of the lung; and determining viability of the lung for transplantation based on the impedance of the lung.

In some embodiments, determining the impedance of the lung includes determining the impedance of the lung at multiple points in time during preservation of the lung. In some embodiments, the method can include determining viability of the lung for transplantation based on a change in impedance during preservation of the lung.

In some embodiments, the methods herein can include providing a transport container configured to receive a lung; sealing an airway of the lung to a lung adapter of the transport container; delivering, with a pump, gas including oxygen into the lung through the lung adapter to inflate the lung; and removing, with the pump, gas including carbon dioxide from the lung through the lung adapter to deflate the lung, wherein the pump is configured to cyclically inflate and deflate the lung during preservation.

In some embodiments, the system herein can include a transport container configured to receive a lung; a lung adapter configured to seal to an airway of the lung; a gas source containing gas including oxygen; a pump configured to deliver the gas including oxygen from the gas source to the lung through the lung adapter to inflate the lung; and the pump configured to remove gas including carbon dioxide from the lung through the lung adapter to deflate the lung, wherein the pump is configured to cyclically inflate and deflate the lung during preservation.

In some embodiments, the methods herein can include placing a lung in a transport container; delivering, using one or more electrodes, electricity to the lung; measuring, using the one or more electrodes, voltage of the lung during hypothermic preservation; determining impedance of the lung based on the voltage of the lung; and pumping oxygen into the lung when the impedance of the lung is above a threshold.

In some embodiments, the methods herein can include providing a transport container configured to receive a lung; sealing an airway of the lung to a lung adapter of the transport container; measuring, using one or more sensors, a first volume in the lung during hypothermic preservation; measuring, using one or more sensors, a first airway pressure of the lung during hypothermic preservation; delivering gas to the airway of the lung or removing gas from the airway of the lung; measuring, using one or more sensors, a second volume in the lung during hypothermic preservation; measuring, using one or more sensors, a second airway pressure of the lung during hypothermic preservation; based on the difference between the first volume and the second volume in the lung and the difference between the first airway pressure and the second airway pressure of the lung, determining a compliance of the lung; and determining viability of the lung for transplantation based on the compliance of the lung.

In some embodiments, the methods herein can include providing a transport container configured to receive a lung; sealing an airway of the lung to a lung adapter of the transport container; measuring, using one or more sensors, a first volume in the lung during hypothermic preservation; measuring, using one or more sensors, a first airway pressure of the lung during hypothermic preservation; delivering gas to the airway of the lung or removing gas from the airway of the lung; measuring, using one or more sensors, a second volume in the lung during hypothermic preservation; measuring, using one or more sensors, a second airway pressure of the lung during hypothermic preservation; based on the difference between the first volume and the second volume in the lung and the difference between the first airway pressure and the second airway pressure of the lung, determining a compliance of the lung; and delivering oxygen into the lung when the compliance of the lung is above a threshold.

In some embodiments, the methods herein can include providing a transport container configured to receive a lung; sealing an airway of the lung to a lung adapter of the transport container; measuring an oxygen consumption rate of the lung; and changing a temperature in the transport container based on the oxygen consumption rate of the lung.

In some embodiments, methods herein can include providing a transport container configured to receive a lung; sealing an airway of the lung to a lung adapter of the transport container; measuring an oxygen concentration in the lung; and changing a temperature in the transport container based on the oxygen concentration in the lung.

DETAILED DESCRIPTION

Figure 1A:
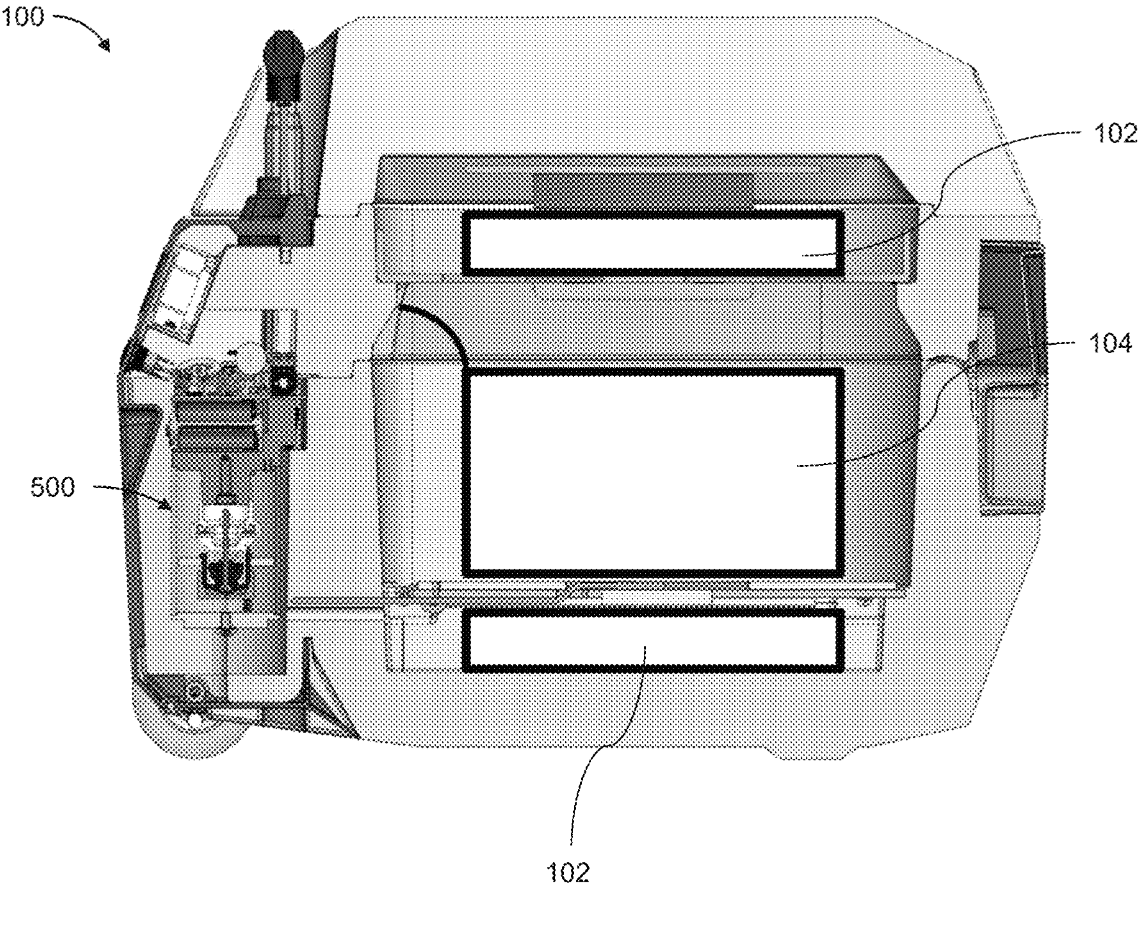
FIG. 1A is a side view of an embodiment of a transport container for an organ with a pneumatic pressure control system.

Devices, systems and methods are described herein that are configured for extracorporeal preservation and transportation of bodily tissue. Specifically, devices for monitoring and stabilizing pressure within inflated lungs are described including organ connectors to filter air moving to and from the lung and to permit any leaked air to escape the preservation fluid-filled container. Systems and methods can compensate for pressure changes resulting from, for example, increases and decreases in altitude during air transport of the organ. By bleeding off and returning excess gases, volumetric expansion of the lung (i.e., over-inflation) may be prevented, avoiding damaging the organ which can result in decreased organ viability and decreased survival rates for transplant recipients. Additional aspects include contoured storage and transport chambers that can replicate the in-vivo anatomical orientation and geometry for a given organ. For example, a pair of donor lungs may be placed against a smooth, raised, central saddle designed to replicate the spine that the lungs would be resting against in vivo. Organs, such as lungs or hearts, may be suspended in an upright position to replicate the organ's orientation in a standing human and to prevent tissue damage caused by pressure from the organ's own weight resting on itself.

The devices, systems and methods described herein can be used to transport organs from a donor to a recipient while maintaining both the temperature of the organ and the differential pressure in the organ relative to its environment. Organs can be exposed to substantial environmental pressure changes in transit due to both air travel and differences in elevation of the donor and recipient sites. Negative clinical effects of both high and low differential organ pressures have been documented in the literature. The devices, systems and methods described herein are intended to improve clinical outcomes by maintaining the temperature and differential pressure of the organs during transit at levels that are known to be safe.

In certain embodiments, pressure modulation can be carried out using various combinations of electronic pumps, compressed gas, pressure regulators, pressure relief valves, filters, pressure accumulators, and compressive features. The pressure modulating apparatuses may be connected to the interior airways of a stored lung in order to add and remove gas to maintain a desired pressure. The air connection is preferably sealed to allow the pressure regulation to function and to maintain a sterile environment. Pressure modulating apparatuses may be connected to a sealed environment of a sealed organ in order to add and remove gas to maintain a desired pressure. A coupled compressed gas source or an interior environment of the storage container may comprise oxygen in order to provide oxygen to the living tissue being stored. A pressure regulator may sense pressure within the system and open a connection to the compressed gas source in order to increase pressure when the system pressure falls below a selected threshold that may result in tissue damage. Similarly, if pressure within the system is above a safe threshold to avoid tissue damage, one or more pressure relief valves may release excess gas volume until the desired internal pressure is achieved. Any point of access for adding or releasing gas may include a filter to avoid contamination of the sterile environment.

Figure 1B:
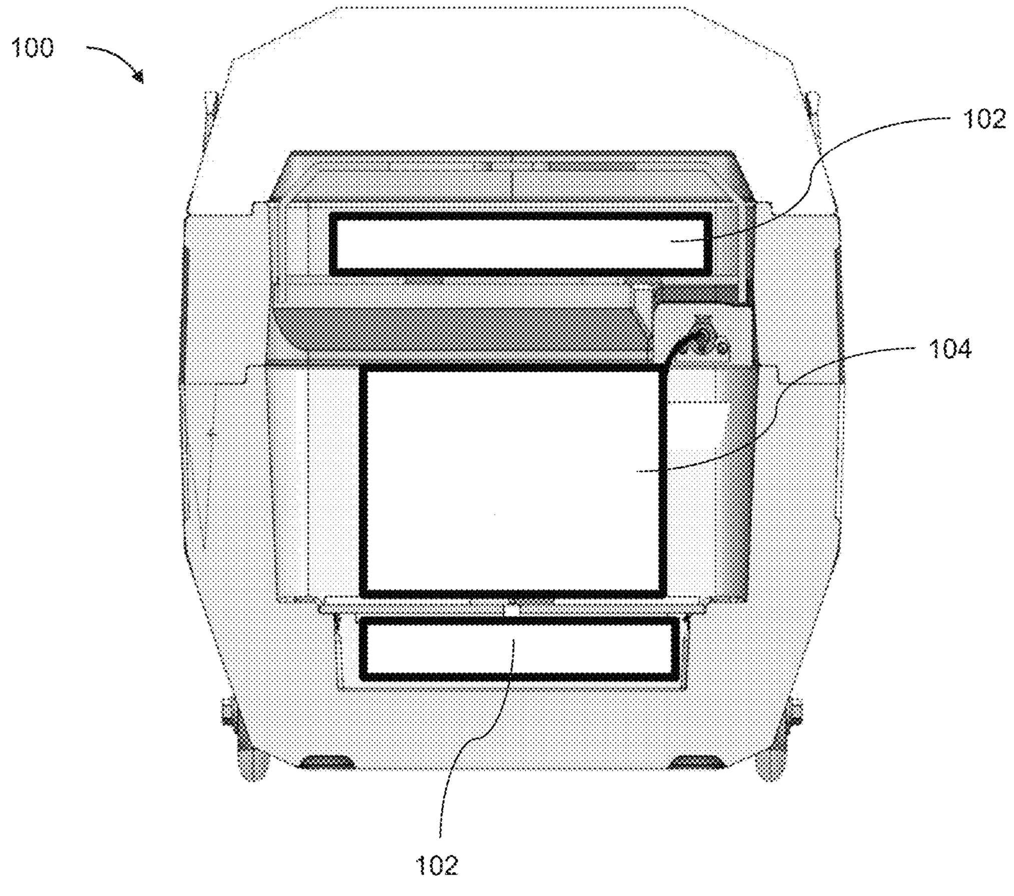
FIG. 1B is a front view of an embodiment of a transport container for an organ with a pneumatic pressure control system.

FIGS. 1A and 1B shows a side view and a front view of an exemplary transport container 100 with a pneumatic pressure control system 500. The transport container 100 can be a storage container. The transport container 100 can include cooling and/or insulating materials to cool the tissue to a desired temperature and maintain that temperature for an extended period. The system may use any of a number of cooling media to maintain the temperature inside an insulated transport container 100 during transport. Cooling media may comprise eutectic cooling blocks, which have been engineered to have a stable temperature between 2-10° C., 2-8° C., 0-10° C., or 0-8° C. for example. The cooling media can be arranged in recesses 102 in the interior of the insulated vessel. The recesses 102 may be a slot or the recess 102 may be a press-fit, or the cooling media may be coupled to the walls of the insulated vessel using a snap, screw, hook and loop, or another suitable connecter. Eutectic cooling media suitable for use with the system is available from TCP Reliable Inc. Edison, NJ 08837, as well as other suppliers. Other media, such as containerized water, containerized water-alcohol mixtures, or containerized water-glycol mixtures may also be used. The transport container 100 need not be rigid, for example the cooling media may be contained in a bag which is placed in the recess 102. Using the cooling media, e.g. eutectic cooling blocks, the invention is capable of maintaining the temperature of the sample in the range of 2-10° C. for at least 60 minutes, e.g., for greater than 4 hours, for greater than 8 hours, for greater than 12 hours, or for greater than 16 hours.

In various embodiments, cooling blocks may include eutectic cooling media or other phase change material (PCM) such as savENRG packs with PCM-HS01P material commercially available from RGEES, LLC or Akuratemp, LLC (Arden, NC). Exemplary PCM specifications including a freezing temperature of 0° C.+/−0.5° C., a melting temperature of 1° C.+/−0.75° C., latent heat of 310 J/g+/−10 J/g, and density of 0.95 gram/ml+/−0.05 gram/ml. Pouch dimensions may vary depending on application specifics such as tissue to be transported and the internal dimensions of the transport container 100 and external dimensions of the tissue storage device, chamber, or canister. PCM may be included in pouches approximately 10 inches by 6 inches having approximately 230 g of PCM therein. In some embodiments, the transport container 100 can have integrated coolant in the walls. In some embodiments, the transport container 100 can have active temperature maintenance.

Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage container and may have dimensions of about 6 inches by about 26 inches consisting of approximately 8 individual pouches joined together in the band. Pouches may be formed of a film for containing the PCM having a desirable moisture vapor transmission rate to avoid PCM mass loss over time. Suitable films include X2030 EVOH and nylon pouch film available from Protect-all (Darien, WI) and pluss plain laminate 162μ OP nylon multilayer film 350 mm available from Shrinath Rotopack Pvt. Ltd. (India).

The recesses 102 for PCM may be above the organ chamber 104. The recesses 102 for PCM may be below the organ chamber 104. The recesses 102 for PCM may be above and below the organ chamber 104. He organ chamber 104 can contain the organ storage system 700. In some embodiments, the transport container 100 can have a rigid bottom portion and a flexible top portion. In some embodiments, the transport container can have a pressure management module disposed within it. The PCM can be placed above and below the organ chamber.

One or more racks may be included below and/or above the organ and may include a pattern of holes. The holes may receive support rods which can be placed in different patterns of holes depending on the size and shape of the tissue being transported to maintain the tissue in a desired position and prevent lateral movement thereof during transportation and storage. The organ can be suspended with a suspension mechanism.

In various embodiments, organ containers may comprise insulation material at least around the organ chamber. Preferably, all sides of the organ chamber 104 are insulated, along with the pumping chamber in embodiments where a pumping chamber is included. Insulation material can comprise an aerogel. When used in conjunction with cooling blocks or packs within the insulated area, containers of the invention can maintain a desired temperature for extended periods of time of 18 hours or more. Aerogel insulation materials may be at least 1 mm, at least 2 mm, at least 3 mm, at least 4 mm, at least 5 mm, at least 6 mm, at least 7 mm, at least 8 mm, at least 9 mm, at least 10 mm, or at least 15 mm thick in various embodiments. The thickness of the aerogel insulation may vary at different points around the container (e.g., thicker at the top and bottom than the sides). In some embodiments, the transport container 100 can include features to constrain the position of the organ.

The transport container 100 can have a handle for transporting the transport container 100. The handle can be retractable. The transport container 100 can have wheels for transporting the transport container 100.

Figure 2:
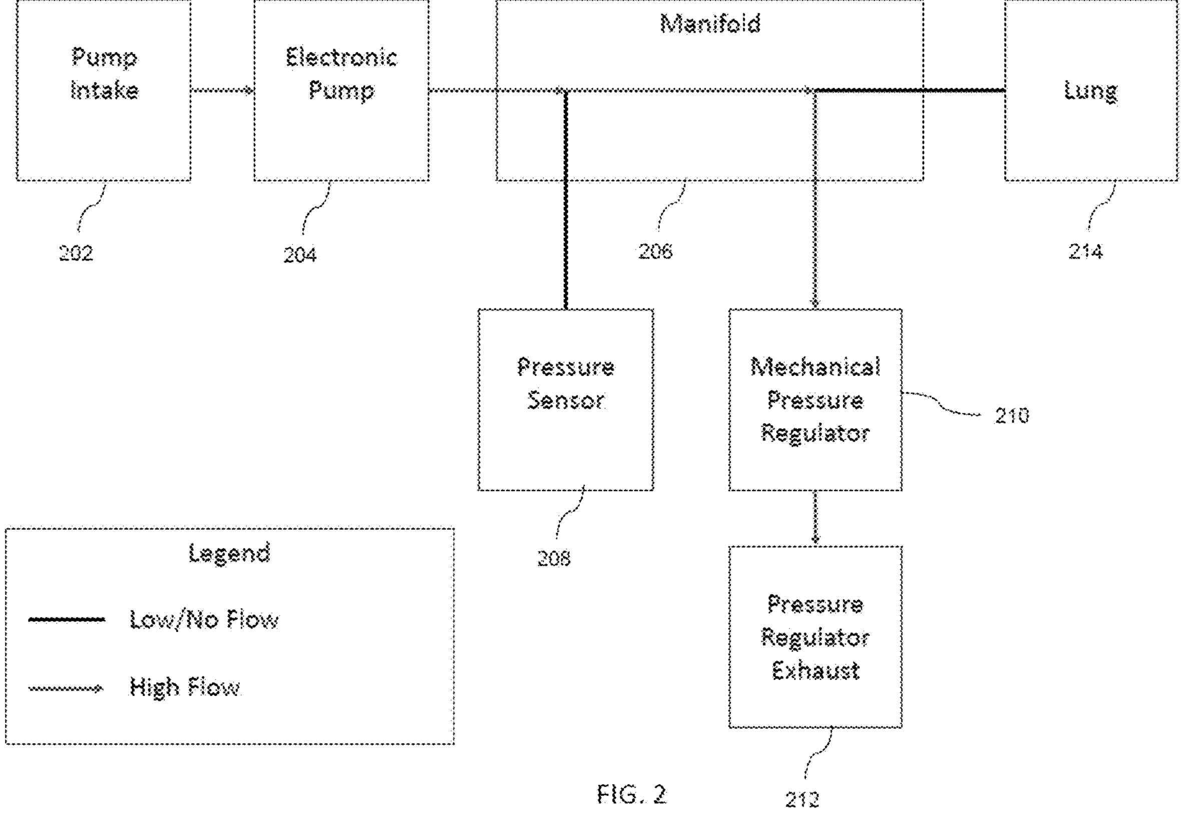
FIG. 2 is an example schematic of the flow of air in an embodiment of a pneumatic pressure control system when lung pressure is at target pressure.

FIG. 2 is an example schematic of the flow of air in an embodiment of a pneumatic pressure control system 500 when lung pressure is at target pressure. In some embodiments, target pressure can be 10-15 $cmH_2O$. In some embodiments, target pressure can be 12-15 $cmH_2O$. In particular embodiments, the target differential pressure is fixed. In certain examples, the user may adjust the target differential pressure. The electronic pump 204 can pump gas from the pump intake 202 to the manifold 206. The pump 204 can be a peristaltic pump, a positive displacement pump, a kinetic pump, a centrifugal pump, a jet pump, and/or a diffusion pump. The pump intake 202 can take in gas from the interior of the transport container 100. The gas from the interior of the transport container 100 can be cooled by the PCM.

A pressure sensor 208 can be positioned near the manifold 206. The pressure sensor may be electric and include a wireless sender located on the closed system such that pressure may be wirelessly monitored from outside an organ transport container during transport.

The manifold 206 can at least partially allow the gas flowing from the electronic pump 204 to flow to the mechanical pressure regulator 210. The mechanical pressure regulator 210 can allow the gas to flow out of the pressure regulator exhaust 212. The mechanical pressure regulator 210 can at least partially open a valve to the pressure regulator exhaust 212 when lung pressure is at target pressure. The pressure regulator exhaust 212 can release the gas back into the interior of the transport container 100. The pressure regulator exhaust 212 can release the gas to the exterior of the transport container 100.

In some embodiments, gas does not flow between the manifold 206 and the lung 214 when the lung pressure is at target pressure. The system herein may include an intake filter 506 upstream of the electronic pump 204 that filters out larger particulate to prevent pump damage. The intake filter 506 may be a 48 micron intake filter.

Figure 3:
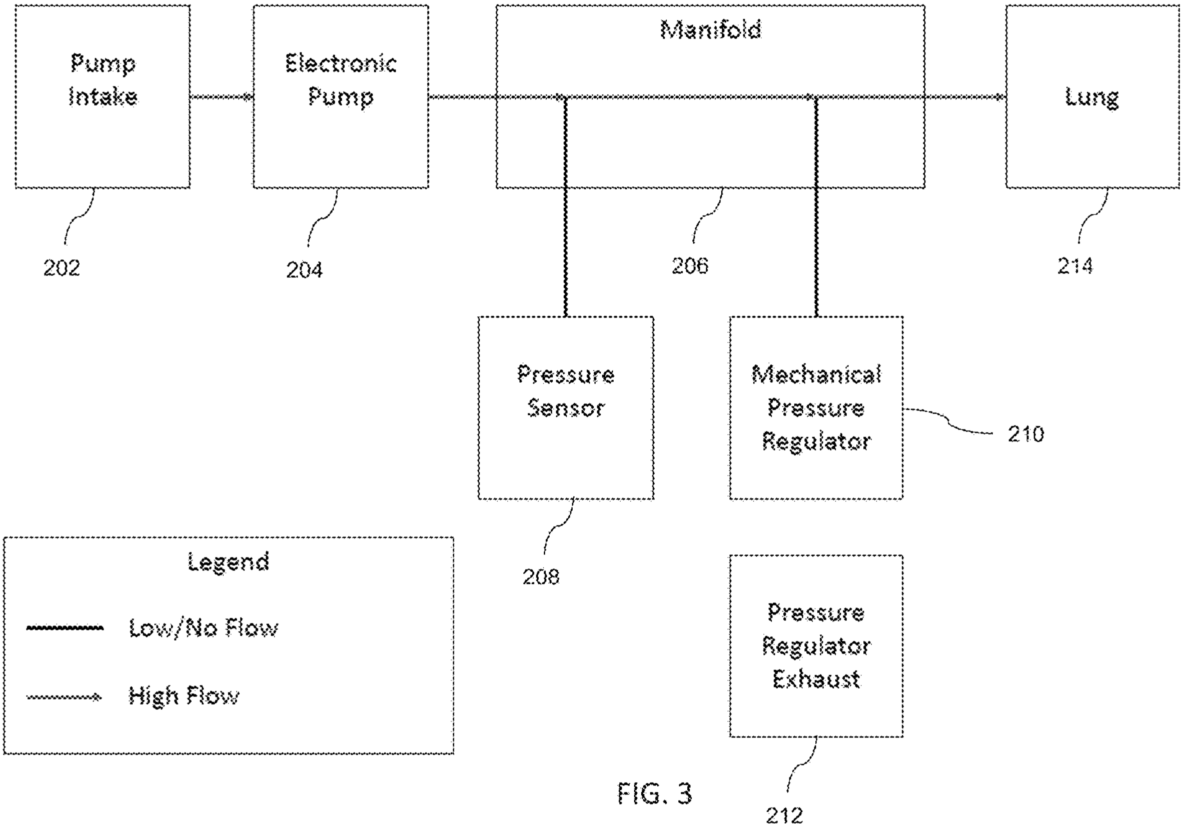
FIG. 3 is an example schematic of the flow of air in an embodiment of a pneumatic pressure control system when lung pressure is below target pressure.

FIG. 3 is an example schematic of the flow of air in an embodiment of a pneumatic pressure control system 500 when lung pressure is below target pressure. In some embodiments, below target pressure can be below 10 $cmH_2O$. In some embodiments, below target pressure can be below 12 $cmH_2O$. The electronic pump 204 can pump gas from the pump intake 202 to the manifold 206.

The mechanical pressure regulator 210 can at least partially prevent the gas from flowing out of the pressure regulator exhaust 212. The mechanical pressure regulator 210 can at least partially close a valve to the pressure regulator exhaust 212 when lung pressure is below target pressure. In some embodiments, gas does not flow between the manifold 206 and the mechanical pressure regulator 210 when the lung pressure is below target pressure. In some embodiments, gas has a low flow between the manifold 206 and the mechanical pressure regulator 210 when the lung pressure is below target pressure.

The manifold 206 can allow the gas flowing from the electronic pump 204 to flow to the lung 214. The flow of gas into the lung 214 can cause pressure in the lung 214 to increase. The flow of gas into the lung 214 can cause the lung 214 to inflate.

Figure 4:
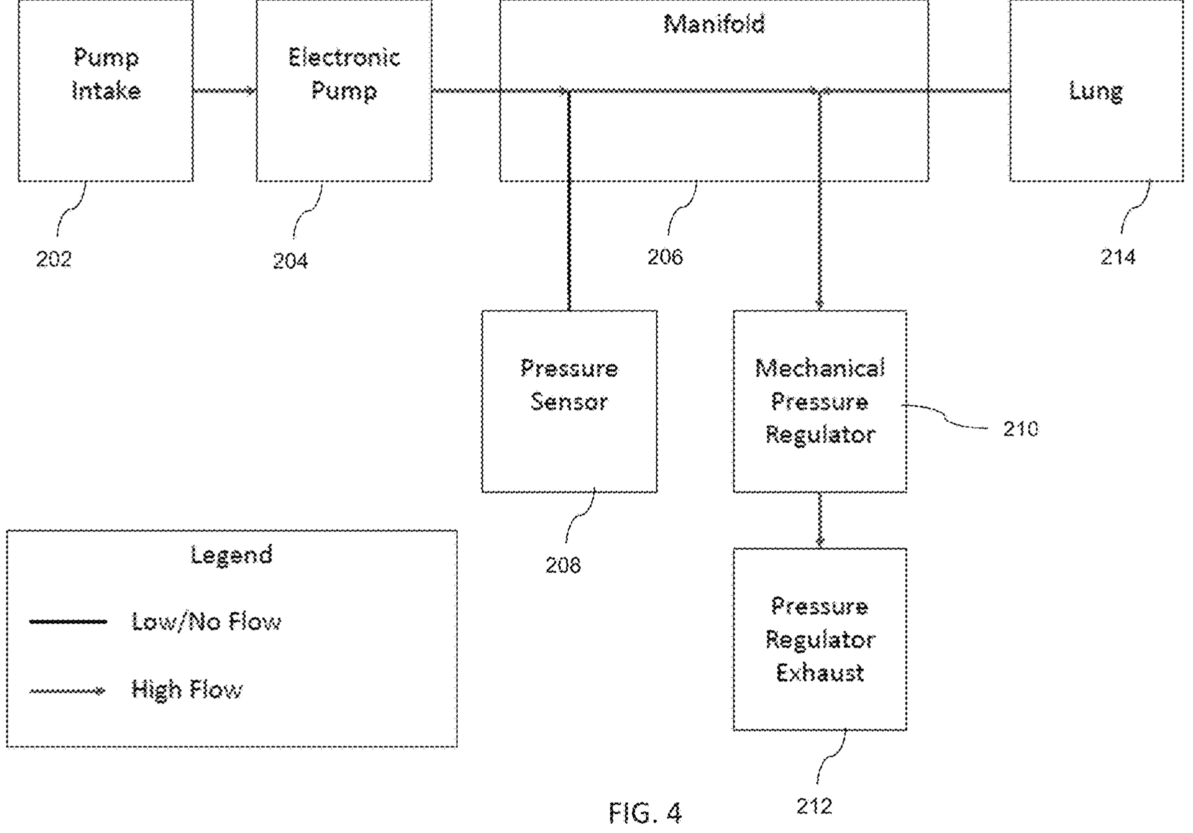
FIG. 4 is an example schematic of the flow of air in an embodiment of a pneumatic pressure control system when lung pressure is above target pressure.

FIG. 4 is an example schematic of the flow of air in an embodiment of a pneumatic pressure control system 500 when lung pressure is above target pressure. In some embodiments, above target pressure can be above 15 $cmH_2O$. The electronic pump 204 can pump gas from the pump intake 202 to the manifold 206.

The mechanical pressure regulator 210 can at least partially allow gas to flow out of the pressure regulator exhaust 212. The mechanical pressure regulator 210 can at least partially open a valve to the pressure regulator exhaust 212 when lung pressure is below target pressure. Gas can release from the pressure regulator exhaust 212 into the interior of the transport container 100. The pressure regulator exhaust 212 can release the gas to the exterior of the transport container 100.

Gas can flow from the lung 214 to the manifold 206. The flow of gas from the lung 214 can cause pressure in the lung 214 to decrease. The flow of gas from the lung 214 can cause the lung 214 to deflate.

In some embodiments, the flow of gas to the mechanical pressure regulator 210 is higher when lung pressure is above target pressure than when lung pressure is at target pressure. In some embodiments, the flow of gas to the mechanical pressure regulator 210 can be controlled by the opening and closing the valve to the pressure regulator exhaust 212 to varying degrees.

Included in the system, in some embodiments, may be a pressure regulator for controlling when gas is added to the system, one or more check valves for preventing back-flow of gas, one or more pressure relief valves for allowing excess gas to escape the lungs, and one or more connectors to facilitate system setup. Pressure can be maintained between 10-15 $cmH_2O$ by the regulator and relief valves. Pressure can be maintained between 12-15 $cmH_2O$ by the regulator and relief valves.

When lung pressure is at target pressure, the valve can be open enough to allow most of all of the gas from the electronic pump to flow out of the pressure regulator exhaust 212, but closed enough to prevent some or all of the gas from the lung from flowing out of the pressure regulator exhaust 212. When lung pressure is above target pressure, the valve can be open enough to allow most or all of the gas from the electronic pump to flow out of the pressure regulator exhaust 212, and open enough to allow some gas from the lung to flow out of the pressure regulator exhaust 212. When lung pressure is below target pressure, the valve can be closed enough to prevent some or all of the gas from the electronic pump from flowing out of the pressure regulator exhaust 212, and closed enough to prevent some or all of the gas from the lung from flowing out of the pressure regulator exhaust 212.

Systems herein may include a variety of sensors configured to sense and report, for example, temperature of the tissue, ambient temperature, airway temperature, temperature of a preservation fluid or perfusate, pressure within the closed air system, pressure within the fluid, or ambient pressure. Displays for the sensors may be disposed on the outer surfaces of the organ transport or may be wirelessly linked to the internal sensors. The air entering the organ may be temperature controlled as it is taken in from the interior of the transport container 100, which is temperature controlled. In some embodiments, the gas can be humidified by a humidifying element as it travels to the lumen of the organ. In some embodiments, a display connected to the sensors may be disposed on the outside of the transport container 100.

The systems herein can include a datalogger capable of logging and displaying temperature, pressure, and/or battery voltage. Information from the datalogger can be displayed on an outside of the transport container 100. Information from the datalogger can be displayed on a mobile application. Information from the datalogger can be displayed on a computer. In some embodiments, the systems herein can include sensors to measure the position, velocity, and acceleration of the transport container. In some embodiments, the sensors can transmit position, velocity, and acceleration data wirelessly to be displayed on a mobile application or computer.

In some embodiments, a temperature sensor may include a probe positioned in the transport cavity and attached by a flexible cable to a temperature datalogger. The probe may not be wetted (i.e., the probe would remain outside of any sterile bags or containers) and may be suspended in air by a bracket or support in order to avoid direct contact with any cooling materials. The probe would thereby record and/or report the cavity temperature rather than the lung tissue temperature. The probe may be outside the outer bag 712. The probe may be outside the middle bag 714. The probe may be outside the inner bag 716. The probe may be inside the inner bag 716. The probe can measure temperature through the bags. In some embodiments, temperature is measured directly inside the organ. In some embodiments, temperature is measured directly inside an airway of the organ.

In certain embodiments, the sensor may comprise a mechanical flag that indicates the possibility that additional pressure was absorbed by the lung tissue through over-inflation. In certain embodiments, the sensor may comprise a mechanical flag that indicates high pressure in the system. In certain embodiments, the sensor may comprise a mechanical flag that indicates low pressure in the system. A datalogger connected to the pressure sensor may initiate the mechanical flag. A mechanical flag may indicate that the temperature is above or below a threshold. The mechanical flag may be an alarm.

In certain examples, the pump intake 202 can take in gas from the interior of the transport container 100. In another embodiment, the pump intake 202 can take in gas from the external environment. In another embodiment, the pump intake 202 can take in gas from a pressurized gas source.

In some embodiments, the pump 204 and/or the pressure regulator 210 can be used to cycle pressure in the lung 214. For example, the pump 204 and/or the pressure regulator 210 can be used to inflate and deflate the lung 214 in a cycle. The pump 204 and/or the pressure regulator 210 can be used to ventilate the lung 214.

Figure 5:
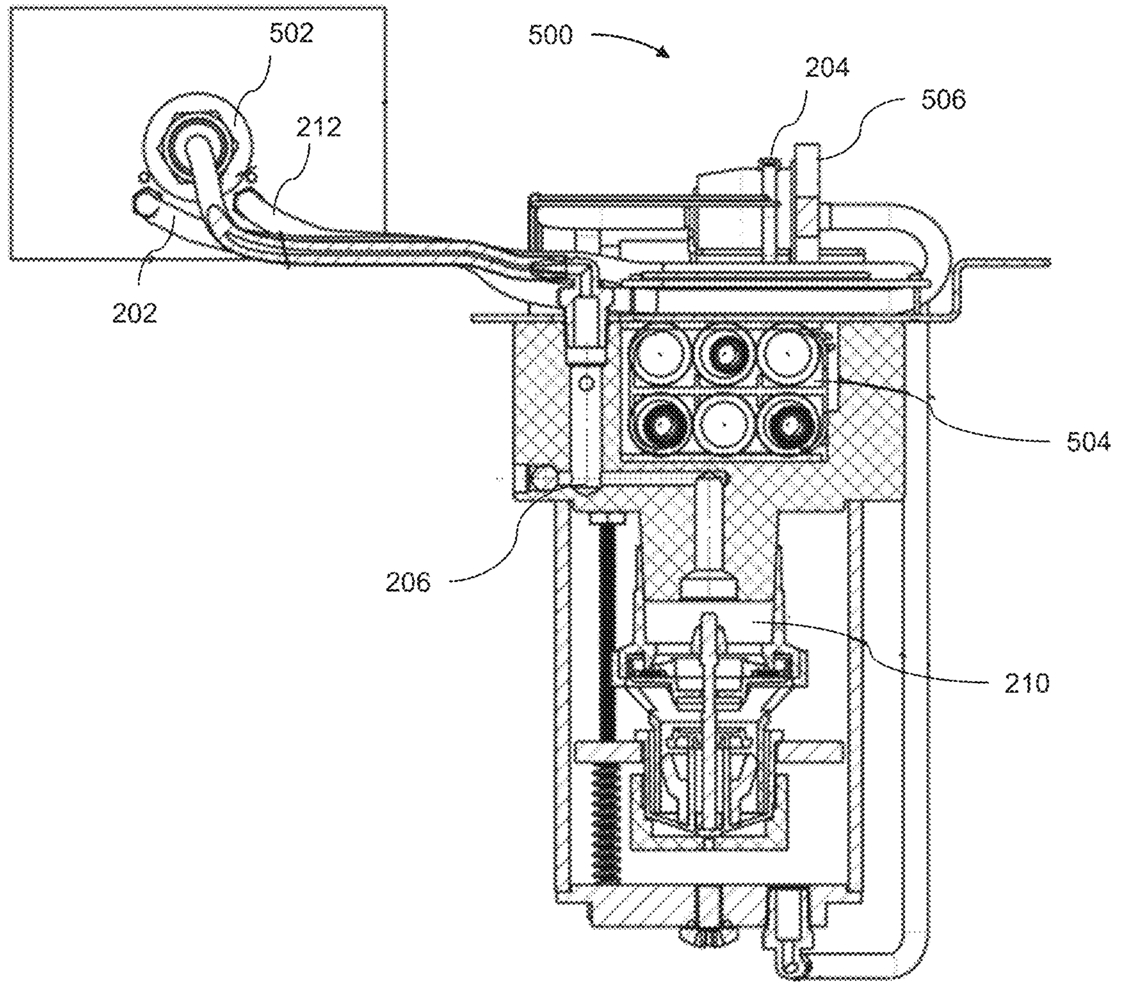
FIG. 5 is a front view of a pneumatic pressure control system.
Figure 6:
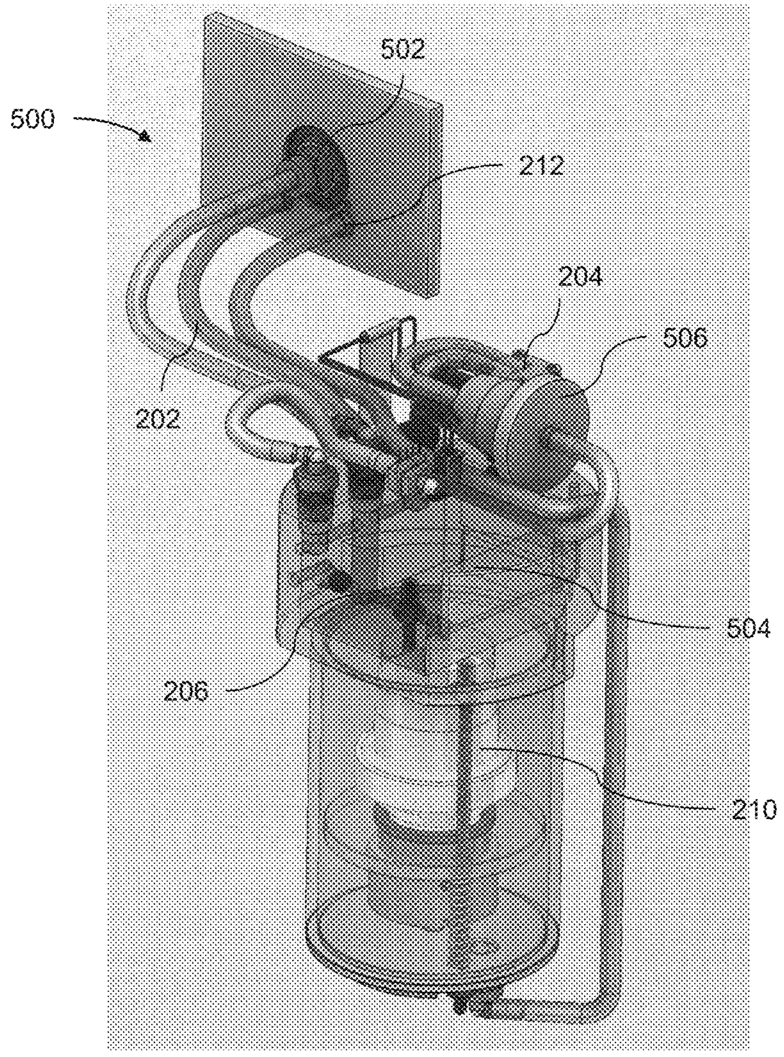
FIG. 6 is an angled, side view of a pneumatic pressure control system.

FIG. 5 is a front view of a pneumatic pressure control system 500. FIG. 6 is an angled, side view of a pneumatic pressure control system 500. The system includes a pump intake 202 that can be connected to the interior of the transport container 100. Gas can flow from the transport container 100 to the pump intake 202 to the electronic pump 204. The electronic pump 204 can pump the gas to the manifold 206. The gas can flow from the manifold 206 to the mechanical pressure regulator 210 and/or the organ output 502. The organ output 502 is connected to the outer bag connector 702. The mechanical pressure regulator 210 is connected to the pressure regulator exhaust 212. The mechanical pressure regulator 210 can control a valve that increases or decreases a gas release rate from the pressure regulator exhaust 212.

The battery pack 504 can power or charge the electronic pump 204. The electronic pump 204 can be powered on and off by the user using a switch. The electronic pump 204 can run at a constant rate during transport. In some embodiments, the system includes an interlock feature where the pump is only powered when the organ container is connected to it. In some embodiments, the system can use rechargeable batteries. In some embodiments, the system can use AC power.

In some embodiments, a pressure management system including hardware and software can actively pump air into and out of organ and/or the environment to maintain constant pressure differential. In some embodiments, a pressure management system including hardware and software can actively pump air into and out of organ and/or the environment to replicate a physiologic pressure cycle. In some embodiments, the organ container can have an integrated connector for a ventilator.

Figure 7:
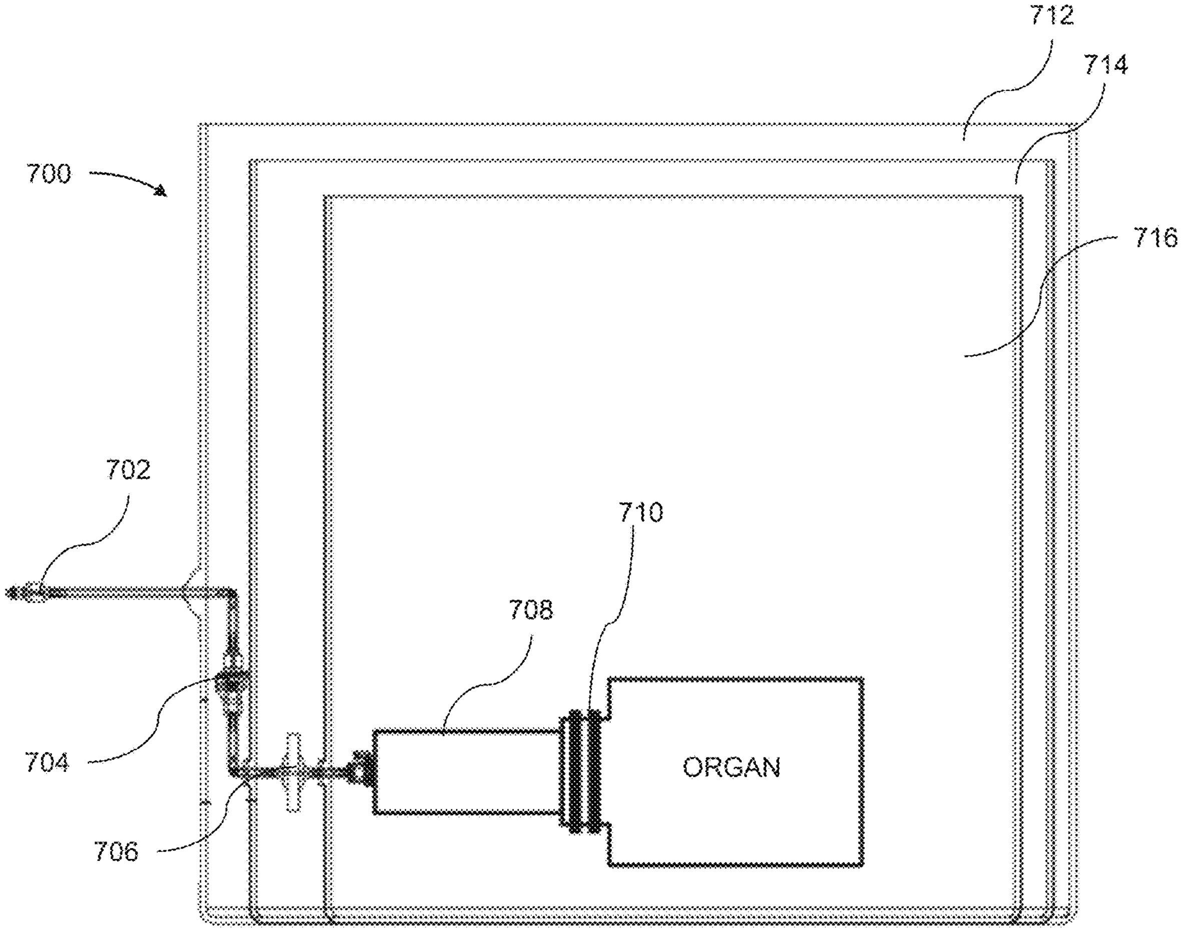
FIG. 7 is a side view of an organ storage system.

FIG. 7 is a side view of an organ storage system 700. Systems and methods of the invention may include sterile, nested containers for isolating stored tissue from the external environment and the potentially contaminated interior of various storage and transport apparatuses. The containers can include a nested series of three sealed bags with the organ (e.g., lungs) being placed in the inner bag 716 and that bag being then sealed in two additional bags. The bags may have one or more connectors allowing gasses or other fluids to move between the bags, the tissue, and the external environment.

The organ storage system 700 can be positioned in the transport container 100. The outer bag connector 702 can be connected to the organ output 502. Gas can flow between the outer bag connector 702 and the organ output 502. The outer bag connector 702 can be external to the outer bag 712. The outer bag connector 702 can have an airway sealing mechanism. In some embodiments, the outer bag can include a connection point for a ventilator or an endotracheal tube.

The middle bag connector 704 can be connected to the outer bag connector 702. The middle bag connector 704 can be inside the outer bag 712 and external to the middle bag 714. The middle bag connector 704 can have an airway sealing mechanism. Each connector may include a flange to be sealed to its nested container and may include its own filter. In certain embodiments, a single filter may be used on the air line. Joining the connectors, filters, and tubing can provide a sterile, sealed connection between a gas source and the internal lung via an endotracheal tube. The bags can include tubes. The tubes can be welded in to the bags. The connectors can be part of the tubing of the bags. In some embodiments, the bags can store statically inflated organs and the pressure inside the bags can be actively controlled. In some embodiments, the bags can include easy to assemble scaffolding. The bags can include integrated sealing mechanisms. The shipper or transport container 100 can have features for securing the position of the bags. The bags can have features for securing the position of the organ.

The sterilizing filter 706 can be connected to the middle bag connector 704. The sterilizing filter 706 can be inside the middle bag 714 and external to the inner bag 716. The sterilizing filter can be external to the outer bag 712. The sterilizing filter can be internal to the inner bag 716. The sterilizing filter 706 can filter the gas flowing through. The sterilizing filter 706 can include an outer housing which can include tie-off locations for securing sterile isolation bags. The tie-off locations can comprise circumferential indentations in the outer surface of the sterilizing filter 706 to provide purchase for the tie-off mechanism and prevent incidental separation of the sterile isolation bag from the assembly. The sterilizing filter 706 can ensure that gas entering the organ is sterile.

The organ adapter 708 can be connected to the sterilizing filter 706. The organ adapter can be inside the inner bag 716. The organ adapter 708 can be sealed to an organ. The organ adapter 78 may comprise a lumen that, when the organ adapter 708 is coupled to the lung, is in fluid communication with the airways of the lung. The organ adapter can be sealed to the organ using cable ties 710. The organ adapter 708 can include an integrated mechanism for sealing to the organ. The organ adapter 708 can be sealed to the organ using a clamp. The organ adapter 708 can be sealed to the organ using strings. The cable ties 710 can have sleeves on them to prevent the bag material from being caught in them when the cable ties 710 are tightened. The sleeves on the cable ties 710 can prevent puncturing of the bags. In some embodiments, the cable ties can form an airtight seal. In some embodiments, the bags can be tied closed with strings. In some embodiments, the sterile bags contain integrated structural supports that allow them to be loaded or unloaded without the use of an external structure such as a basin. In some embodiments, the sterile bags include external structural supports that allow them to be loaded or unloaded.

The organ adapter 708 can be sealed to a bronchus of the lung. The organ adapter 708 can be sealed to a trachea of the lung. The organ adapter 708 may be a connection point for securing an endotracheal tube or otherwise securing the lungs. The connection point should form a tight seal such that the only gas or fluid access to the internal lung is through the air line and sterilizing filter 706. The air line may have a sealing mechanism, such as a clamp, to seal off the internal lung during connection and disconnection from the pressure regulating apparatus.

Accordingly, the bagged organ may be easily and quickly connected to the pneumatic pressure control system 500 and inflated during loading and easily and quickly disconnected upon arrival at the transplantation site. To maintain an aseptic environment in the bags outside of the airway, all three bags can be closed using an external closure mechanism such as the cable ties 710 or hand-tied strings. The outer bag 712 can be removed before entering a sterile environment at the transplantation site, as the outer bag 712 may no longer be sterile. The outer bag 712 may be removed if the outer bag is contaminated or possibly contaminated. The middle bag 714 can include an airway sealing mechanism (the middle bag connector 704). This can allow aseptic transfer of the inner two bags to a sterile field without loss of airway pressure.

In some embodiments, the organ adapter 708 (or simply referred as the adapter) can be configured to support the bodily tissue when the bodily tissue is coupled to the adapter. For example, in some embodiments, the adapter can include a retention mechanism (not shown) configured to be disposed about at least a portion of the bodily tissue and to help retain the bodily tissue with respect to the adapter. The retention mechanism can be, for example, a net, a cage, a sling, or the like. In some embodiments, the system can include a basket (not shown) or other support mechanism configured to support the bodily tissue when the bodily tissue is coupled to the adapter or otherwise received in the system. The organ adapter may be rigidly coupled to an interior wall (e.g. a lid) of an organ container such that the organ may be suspended via its connection point to the adapter. In some embodiments, the organ adapter 708 can have an integrated valve to maintain pressure. In some embodiments, the organ adapter 708 can have an integrated sealing or retention mechanism. In some embodiments, the organ adapter can include a connection point for a ventilator or endotracheal tube.

The portion of the adapter that is inserted into a lumen of the organ may include a series of tapered steps such that a distal end of the adapter portion is narrower than a proximal end. In this manner, the adapter is configured to be inserted into a range of lumen sizes. The portion of the adapter that is inserted into a lumen of the organ may include a mechanism to adjust its diameter. The portion of the adapter that is inserted into a lumen of the organ may include a compliant component that enables sealing onto organs with a range of lumen diameters.

The lumen may be secured or sealed to the organ adapter 708 via any means including elastic tension in the organ lumen itself or through the use of sutures, elastic band, or other securing mechanisms on the outside of the lumen applying pressure thereupon to form an air-tight seal between the lumen of the organ and the lumen of the adapter.

Any gas that may be formed or leak from the interior of the tissue can be vented out through bag filters. Another filter can be included centrally to filter gas passing between the lung internals and the air line.

Nested containers may be configured in a series of 2 or more (preferably 3) sterile nested bags allowing for venting of air via 1-way check valves with integrated hydrophobic filtration media with communication allowed through a series of interconnected ports to a controlled plug (e.g., an accumulator element, relief valve, or gas source), system temperature can be monitored by a temperature probe placed in contact with the outside of the bag. Additional useful information regarding preservation solution temperature, oxygen content, pH, ionic chemistry, and other aspects may be obtained and monitored via a series of integrated probes (temp, oxygen, pH, ion-specific, conductivity, etc.) which may pass into the bags through a series of bulkhead fittings or similar or be placed within the inner bag 716 and communicate in a wireless fashion through near field communications or Bluetooth connectivity or similar to an external device which processes the signal. In certain embodiments, such probes may be affixed to the inner bag 716. In some embodiments, probes may be in a free-floating assembly placed into the bag prior to use. In certain embodiments, probes can be in communication with a user interface such as a display on the device or a remote display. Accordingly, user monitoring can be permitted to allow for environmental parameter recording and/or intervention. In certain embodiments, such probes can be in communication with a computer device including a non-transitory, tangible memory and a processor operable to receive information from the various probes and sensors and engage various apparatuses for maintaining or altering environmental parameters. For example, an active solution management tool may be used to dynamically adjust preservation solution properties to optimize the organ storage environment based on pH, ionic chemistry, or composition by adding or removing compounds from the preservation fluid. The computer may also manipulate cooling or heating elements and or the pressure control mechanisms described herein to maintain optimal storage conditions in response to changes detected via the connected probes. In some embodiments, the container walls may display information regarding preservation solution temperature, pH, ionic chemistry, and other suitable aspects via non-electronic means. For example, an element of the transport container 100 can change color.

In certain embodiments, the containers or nested containers may be rigid cassettes instead of flexible bags. In some embodiments, the nested containers may be a combination of rigid containers, bags, and semi-rigid containers with a rigid component and a flexible component. In such embodiments, it might be desirable to have a larger reservoir of aqueous solution for thermal reasons than might be economically or functionally practical. It might also be of advantage or necessary to provide a rigid container to an organ in transit which would not be provided by flexible bags. In such cases, a sterile, disposable, rigid enclosure may be used to contain the organ and some small volume of preservation solution directly, afterwards being inserted into the standard bag system containing a larger volume of aqueous media (preservation solution or otherwise) that may serve as a thermal reservoir/inertial dampener.

In some embodiments, such enclosures may be completely sealed and may not communicate with the surrounding aqueous media in order to maintain an isolated sterile environment while still realizing certain thermal benefits of a larger fluid reservoir.

In certain embodiments, such enclosures may be perforated such that the fluid inside the enclosure communicates passively with the surrounding aqueous media. In some embodiments, perforated enclosures can communicate actively with the surrounding aqueous media by means of a pump or other means of introducing fluid flow. In certain embodiments, active communication can occur with a reservoir of liquid or gas external to the sterile enclosures for a variety of reasons such as achieving gas exchange for the preservation medium, for example, to actively maintain either nominal equilibration with air or a gas-enriched environment (for example oxygen rich) for tissue preservation. Active communication with an external reservoir can also be used for chemistry exchange for the preservation medium including adjusting dissolved species in the aqueous species over time in either a fixed or dynamic fashion (e.g., introduction of a drug, therapeutic, dilute acid or base to maintain pH, etc.).

Solution exchange (e.g., simply cycling out some fraction of "spent" solution for fresh) and thermal exchange (e.g., creating an isolated microenvironment either surrounding or potentially within the organ that is slightly different from nominal system temp) are other potential functions of an external reservoir in active communication with the sterile cassette. While pressure modulating apparatuses described herein are especially useful in lung storage and transportation, the aforementioned storage containers (e.g., flexible bags, rigid cassettes, or some combination) can also be used to store or transport other tissue or organs including heart, kidney, liver, or pancreas for example. In such embodiments, various organ-specific cassettes or bags may be used that are sized to accommodate the organ being stored or transported. Similarly, organ-specific preservation solutions may also be used and may be pre-loaded into the appropriate container.

The gas entering and leaving the lung may be conditioned to create a favorable preservation environment. The gas may be oxygenated, cooled, humidity-controlled, and/or cycled to provide the preferred characteristics for tissue viability post-transport. Some embodiments may include sensors that measure the oxygen content, temperature, and/or humidity of the gas. Some embodiments may include control systems that modulate the rate of oxygenation, cooling, humidity control, and/or cycling based upon sensor input.

A mechanical pressure regulator 210 or relief valve will augment the internal sealed volume or allow excess gas to escape, relieving any pressure differential and avoiding stress on the tissue. In the example of air travel, as a plane gains altitude, external pressure will drop while the amount of gas sealed within the lung will stay the same causing a pressure differential between the internal and external lung driving expansion of the tissue. As the plane descends, external pressure will increase while internal gas volume remains the same causing a compressive pressure differential on the lung. To compensate, the mechanical pressure regulator 210 can add oxygen or other gasses to oppose the compressive force and avoid tissue damage.

Figure 8:
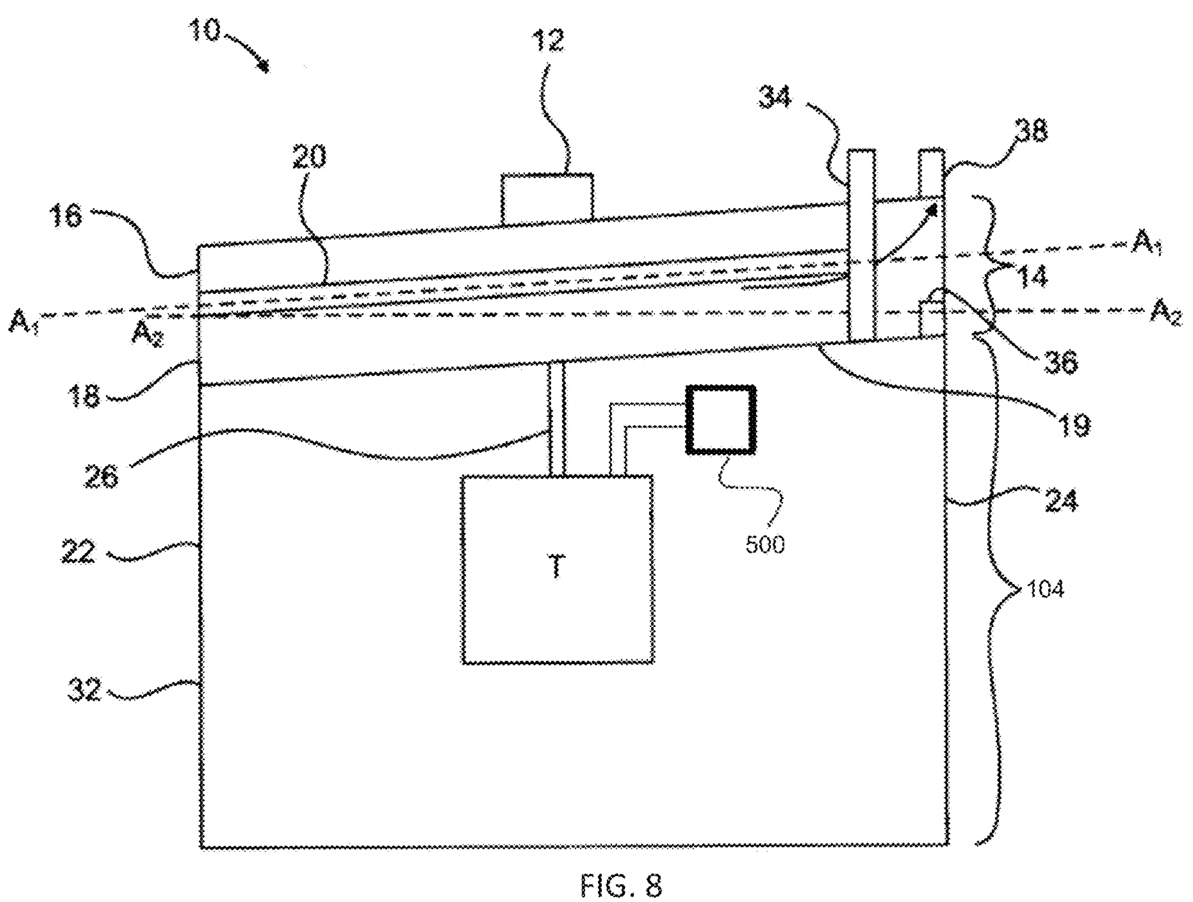
FIG. 8 is an example of the pneumatic pressure control system in connection with a static or perfusion-type preservation apparatus.

FIG. 8 is an example of the pneumatic pressure control system 500 in connection with a static or perfusion-type preservation apparatus. An apparatus 10 is shown configured to oxygenate a perfusate (not shown) received in a pumping chamber 14 of the apparatus. The apparatus 10 includes a valve 12 configured to permit a fluid (e.g., oxygen) to be introduced into a first portion 16 of the pumping chamber 14. A membrane 20 is disposed between the first portion 16 of the pumping chamber 14 and a second portion 18 of the pumping chamber. The membrane 20 is configured to permit the flow of a gas between the first portion 16 of the pumping chamber 14 and the second portion 18 of the pumping chamber through the membrane. The membrane 20 is configured to substantially prevent the flow of a liquid between the second portion 18 of the pumping chamber 14 and the first portion 16 of the pumping chamber through the membrane. In this manner, the membrane can be characterized as being semi-permeable.

The membrane 20 is disposed within the pumping chamber 14 along an axis A1 that is transverse to a horizontal axis A2. Said another way, the membrane 20 is inclined, for example, from a first side 22 to a second side 24 of the apparatus 10. As such, as described in more detail below, a rising fluid in the second portion 18 of the pumping chamber 14 will be directed by the inclined membrane 20 towards a port 38 disposed at the highest portion of the pumping chamber 14. The port 38 is configured to permit the fluid to flow from the pumping chamber 14 into the atmosphere external to the apparatus 10. In some embodiments, the port 38 is configured for unidirectional flow, and thus is configured to prevent a fluid from being introduced into the pumping chamber 14 via the port (e.g., from a source external to the apparatus 10). In some embodiments, the port 38 includes a luer lock.

The second portion 18 of the pumping chamber 14 is configured to receive a fluid. In some embodiments, for example, the second portion 18 of the pumping chamber 14 is configured to receive a liquid perfusate. The second portion 18 of the pumping chamber 14 is in fluid communication with an adapter 26. The adapter 26 is configured to permit movement of the fluid from the pumping chamber 14 to a bodily tissue T. For example, in some embodiments, the pumping chamber 14 defines an aperture (not shown) configured to be in fluidic communication with a lumen (not shown) of the adapter 26. The adapter 26 is configured to be coupled to the bodily tissue T. The adapter 26 can be coupled to the bodily tissue T in any suitable manner. For example, in some embodiments, the adapter 26 is configured to be sutured to the bodily tissue T. In another example, the adapter 26 is coupleable to the bodily tissue T via an intervening structure, such as silastic or other tubing. In some embodiments, at least a portion of the adapter 26, or the intervening structure, is configured to be inserted into the bodily tissue T. For example, in some embodiments, the lumen of the adapter 26 (or a lumen of the intervening structure) is configured to be fluidically coupled to a vessel of the bodily tissue T.

Where the tissue T is, for example a lung, the airways of the tissue T may be coupled to the pneumatic pressure control system 500 (e.g., via the trachea or bronchus).

In some embodiments, the adapter 26 is configured to support the bodily tissue T when the bodily tissue T is coupled to the adapter. For example, in some embodiments, the adapter 26 includes a retention mechanism (not shown) configured to be disposed about at least a portion of the bodily tissue T and to help retain the bodily tissue T with respect to the adapter. The retention mechanism can be, for example, a net, a cage, a sling, or the like. In some embodiments, the apparatus 10 includes a basket (not shown) or other support mechanism configured to support the bodily tissue T when the bodily tissue T is coupled to the adapter 26 or otherwise received in the apparatus 10.

An organ chamber 104 is configured to receive the bodily tissue T and a fluid. In some embodiments, the apparatus 10 includes a port 34 that is extended through the apparatus 10 (e.g., through the pumping chamber 14) to the organ chamber 104. The port 34 is configured to permit fluid (e.g., perfusate) to be introduced to the organ chamber 104. In this manner, fluid can be introduced into the organ chamber 104 as desired by an operator of the apparatus. For example, in some embodiments, a desired amount of perfusate is introduced into the organ chamber 104 via the port 34, such as before disposing the bodily tissue T in the organ chamber 104 and/or while the bodily tissue T is received in the organ chamber. In some embodiments, the port 34 is a unidirectional port, and thus is configured to prevent the flow of fluid from the organ chamber 104 to an area external to the organ chamber through the port. In some embodiments, the port 34 includes a luer lock. The organ chamber 104 may be of any suitable volume necessary for receiving the bodily tissue T and a requisite amount of fluid for maintaining viability of the bodily tissue T. In one embodiment, for example, the volume of the organ chamber 104 is approximately 2 liters.

The organ chamber 104 is formed by a canister 32 and a bottom portion 19 of the pumping chamber 14. In a similar manner as described above with respect to the membrane 20, an upper portion of the organ chamber (defined by the bottom portion 19 of the pumping chamber 14) can be inclined from the first side 22 towards the second side 24 of the apparatus. In this manner, as described in more detail below, a rising fluid in the organ chamber 104 will be directed by the inclined upper portion of the organ chamber towards a valve 36 disposed at a highest portion of the organ chamber. The valve 36 is configured to permit a fluid to flow from the organ chamber 104 to the pumping chamber 14. The valve 36 is configured to prevent flow of a fluid from the pumping chamber 14 to the organ chamber.

The valve 36 can be any suitable valve for permitting unidirectional flow of the fluid, including, for example, a ball check valve.

The canister 32 can be constructed of any suitable material. In some embodiments, the canister 32 is constructed of a material that permits an operator of the apparatus 10 to view at least one of the bodily tissue T or the perfusate received in the organ chamber 104. For example, in some embodiments, the canister 32 is substantially transparent. In another example, in some embodiments, the canister 32 is substantially translucent. The organ chamber 104 can be of any suitable shape and/or size. For example, in some embodiments, the organ chamber 104 can have a perimeter that is substantially oblong, oval, round, square, rectangular, cylindrical, or another suitable shape.

In use, the bodily tissue T is coupled to the adapter 26. The pumping chamber 14 is coupled to the canister 32 such that the bodily tissue T is received in the organ chamber 104. In some embodiments, the pumping chamber 14 and the canister 32 are coupled such that the organ chamber 104 is hermetically sealed. A desired amount of perfusate is introduced into the organ chamber 104 via the port 34. The organ chamber 104 can be filled with the perfusate such that the perfusate volume rises to the highest portion of the organ chamber. The organ chamber 104 can be filled with an additional amount of perfusate such that the perfusate flows from the organ chamber 104 through the valve 36 into the second portion 18 of the pumping chamber 14. The organ chamber 104 can continue to be filled with additional perfusate until all atmospheric gas that initially filled the second portion 18 of the pumping chamber 14 rises along the inclined membrane 20 and escapes through the port 38. Because the gas will be expelled from the pumping chamber 14 via the port 38 before any excess perfusate is expelled (due to gas being lighter, and thus more easily expelled, than liquid), an operator of the apparatus 10 can determine that substantially all excess gas has been expelled from the pumping chamber when excess perfusate is released via the port. As such, the apparatus 10 can be characterized as self-purging. When perfusate begins to flow out of the port 38, the apparatus 10 is in a "purged" state (i.e., all atmospheric gas initially within the organ chamber 104 and the second portion 18 of the pumping chamber 14 has been replaced by perfusate).

When the purged state is reached, the operator can close both ports 34 and 38, preparing the apparatus 10 for operation.

Oxygen (or another suitable fluid, e.g., gas) is introduced into the first portion 16 of the pumping chamber 14 via the valve 12. A positive pressure generated by the introduction of oxygen into the pumping chamber 14 causes the oxygen to be diffused through the semi-permeable membrane 20 into the second portion 18 of the pumping chamber. Because oxygen is a gas, the oxygen expands to substantially fill the first portion 16 of the pumping chamber 14. As such, substantially the entire surface area of the membrane 20 between the first portion 16 and the second portion 18 of the pumping chamber 14 is used to diffuse the oxygen. The oxygen is diffused through the membrane 20 into the perfusate received in the second portion 18 of the pumping chamber 14, thereby oxygenating the perfusate.

In the presence of the positive pressure, the oxygenated perfusate may be moved from the second portion 18 of the pumping chamber 14 into the bodily tissue T via the adapter 26. For example, the positive pressure can cause the perfusate to move from the pumping chamber 14 through the lumen of the adapter 26 into the vessel of the bodily tissue T. The positive pressure is also configured to help move the perfusate through the bodily tissue T such that the bodily tissue T is perfused with oxygenated perfusate.

After the perfusate is perfused through the bodily tissue T, the perfusate is received in the organ chamber 104. In this manner, the perfusate that has been perfused through the bodily tissue T is combined with perfusate previously disposed in the organ chamber 104. In some embodiments, the volume of perfusate received from the bodily tissue T following perfusion combined with the volume of perfusate previously disposed in the organ chamber 104 exceeds a volume (e.g., a maximum fluid capacity) of the organ chamber 104. A portion of the organ chamber 104 is flexible and expands to accept this excess volume. The valve 12 can then allow oxygen to vent from the first portion 16 of the pumping chamber 14, thus, reducing the pressure in the pumping chamber 14. As the pressure in the pumping chamber 14 drops, the flexible portion of the organ chamber 104 relaxes, and the excess perfusate is moved through the valve 36 into the pumping chamber 14. The cycle of oxygenating perfusate and perfusing the bodily tissue T with the oxygenated perfusate can be repeated as desired.

Figure 9:
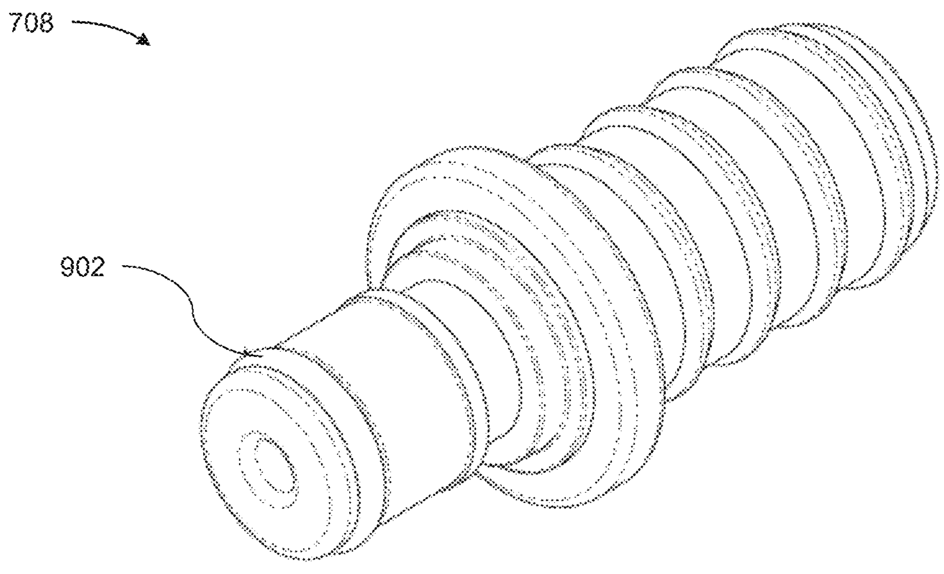
FIG. 9 is an example of a tracheal connector, or organ adapter, of the organ storage system.

FIG. 9 is an example of a tracheal connector, or organ adapter 708, of the organ storage system 700. The tracheal connector can be configured to seal to a trachea or bronchus or other airway of a lunch. The tracheal connector can include an O-ring 902 to ensure an air tight seal. The tracheal connector can be connected to the lung with cable ties 710 or another connection mechanism.

Figure 10A:
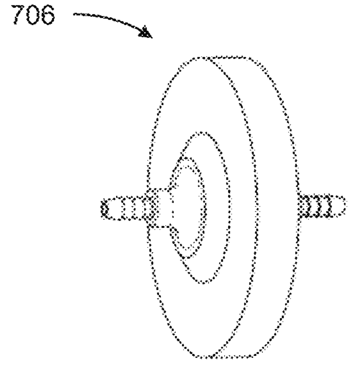
FIG. 10A is a side, angled view of a sterilizing filter of the organ storage system.
Figure 10B:
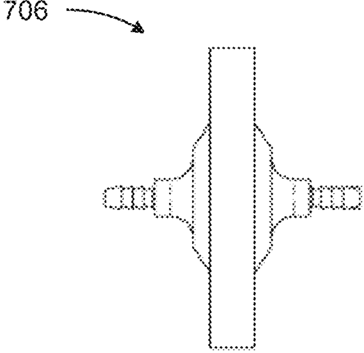
FIG. 10B is a front view of a sterilizing filter of the organ storage system.

FIG. 10A is a side, angled view of a sterilizing filter 706 of the organ storage system 700. FIG. 10B is a front view of a sterilizing filter 706 of the organ storage system 700. The sterilizing filter 706 can be a round filter. In some embodiments, the sterilizing filter 706 can connect to tubing from the inner bag 716 and the middle bag 714.

Figure 11:
FIG. 11 is an example of a manifold of the pneumatic pressure control system.
Figure 11:
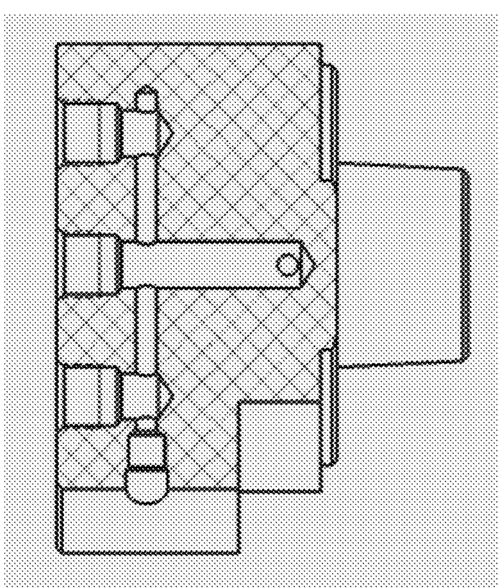

FIG. 11 is an example of a manifold 206 of the pneumatic pressure control system 500. The manifold 206 can have numerous inputs and outputs. The manifold 206 can allow passage of gas in multiple directions.

Figure 12:
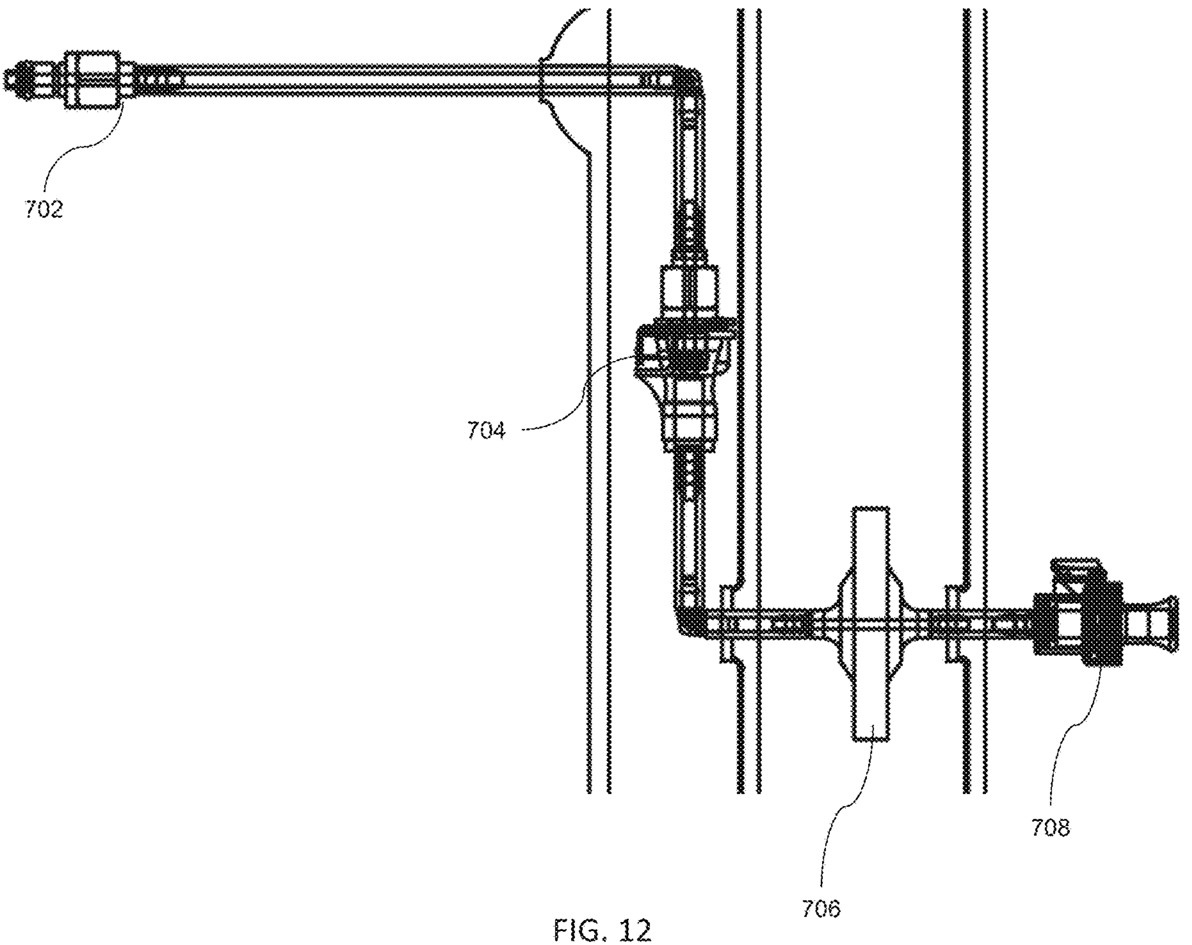
FIG. 12 is an example of tubing between the three bags of the organ storage system.

FIG. 12 is an example of tubing between the three bags of the organ storage system 700. The tubing can be integrated into the bags. The tubing can be connected by the middle bag connector 704 and the sterilizing filter 706. The tubing can connect to an organ at the organ adapter 708. The tubing can be connected to the pneumatic pressure control system 500 by the outer bag connector 702.

Figures 13A, 13B:
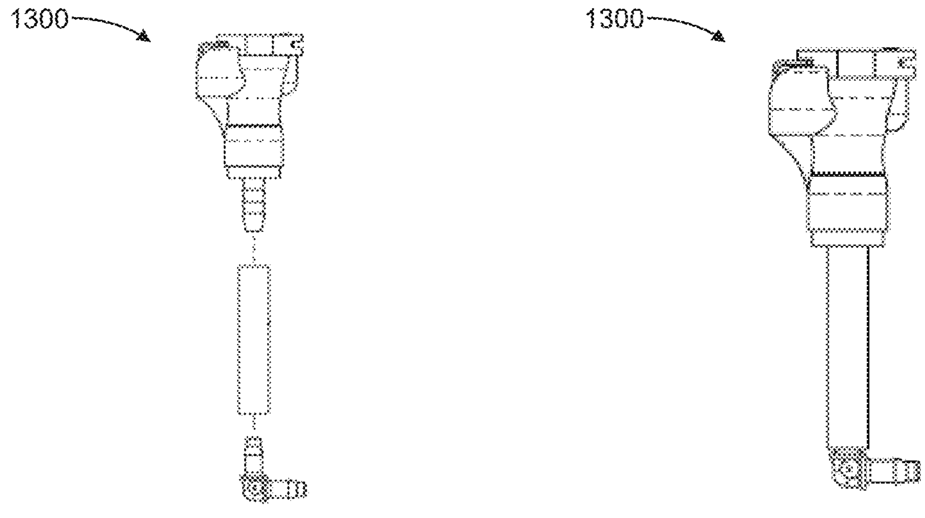
FIG. 13A is an exploded side view of a first portion of the middle bag connector that attaches to the middle bag of the organ storage system.
FIG. 13B is a side view of a first portion of the middle bag connector that attaches to the middle bag of the organ storage system.

FIG. 13A is an exploded side view of a first portion 1300 of the middle bag connector 704 that attaches to the middle bag 714 of the organ storage system 700. FIG. 13B is a side view of a first portion 1300 of the middle bag connector 704 that attaches to the middle bag 714 of the organ storage system 700. The first portion 1300 of the middle bag connector 704 can connect to the second portion 1400 of the middle bag connector 704. This connection can form an airtight seal.

Figures 14A, 14B:
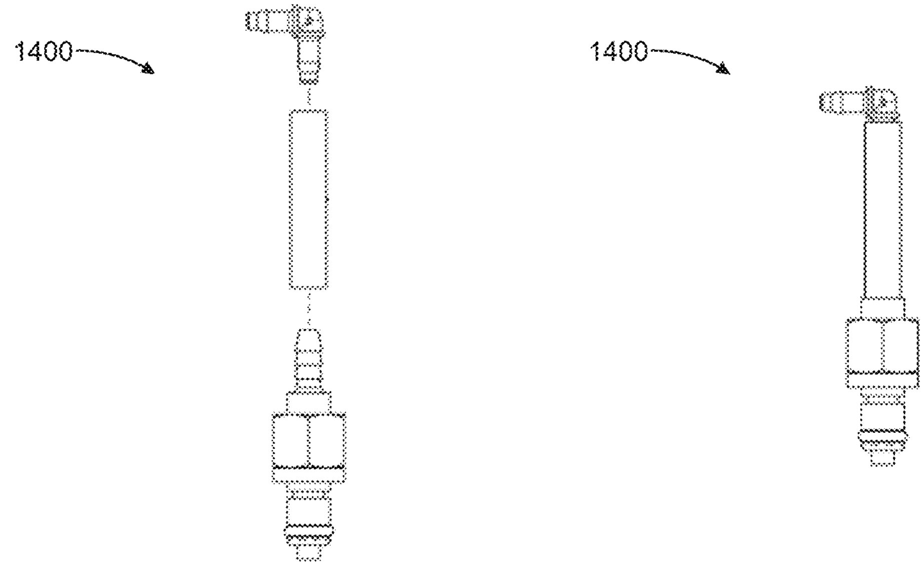
FIG. 14A is an exploded side view of a second portion of the middle bag connector that attaches to the outer bag of the organ storage system.
FIG. 14B is a side view of a second portion of the middle bag connector that attaches to the outer bag of the organ storage system.

FIG. 14A is an exploded side view of a second portion 1400 of the middle bag connector 704 that attaches to the outer bag 712 of the organ storage system 700. FIG. 14B is a side view of a second portion 1400 of the middle bag connector 704 that attaches to the outer bag 712 of the organ storage system 700. The first portion 1300 of the middle bag connector 704 can connect to the second portion 1400 of the middle bag connector 704. This connection can form an airtight seal.

Figure 15:
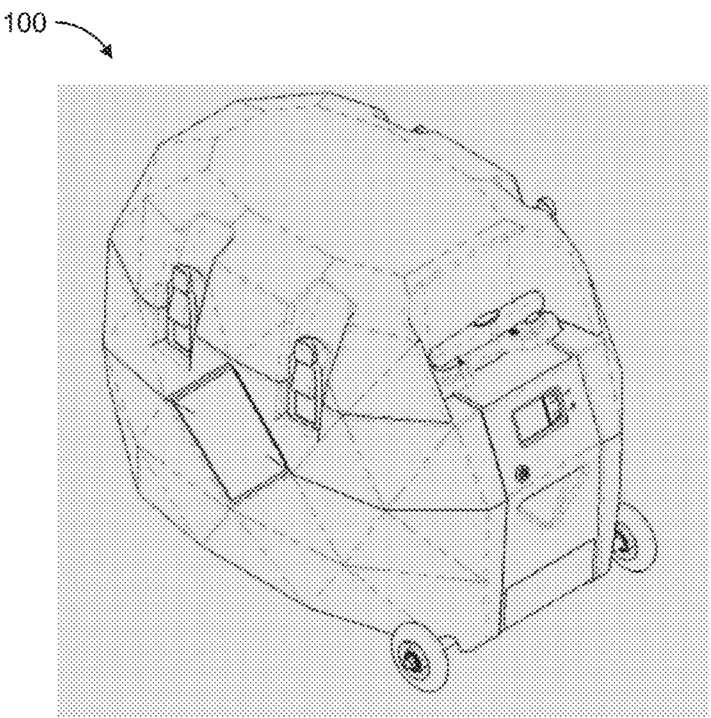
FIG. 15 is an angled, side view of an example of a transport container for an organ with a pneumatic pressure control system.

FIG. 15 is an angled, side view of an example of a transport container 100 for an organ with a pneumatic pressure control system 500. The transport container 100 can have clips to seal a lid to the container. The transport container 100 an have a display. The display can show temperature or pressure of the organ. The display can show information from the datalogger.

Figure 16:
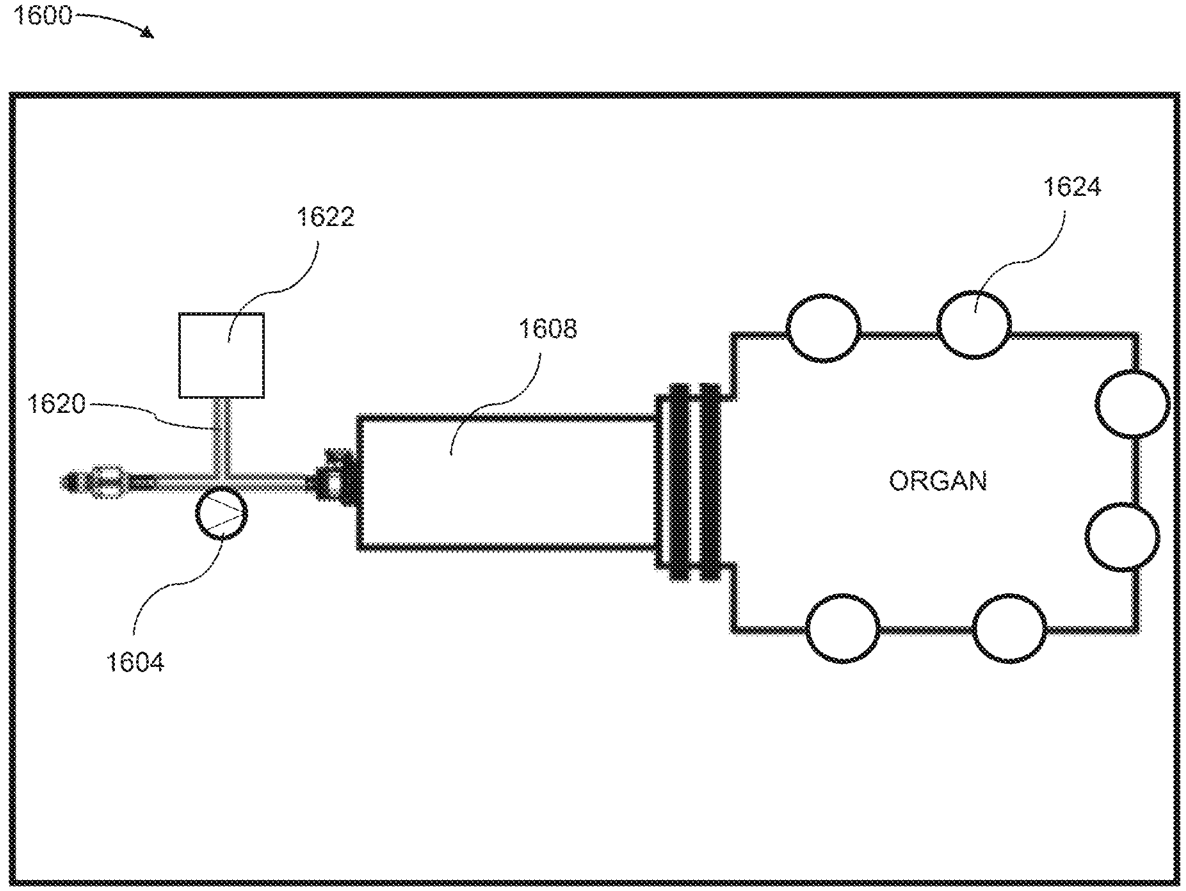
FIG. 16 shows an example of an organ transport system with a component in fluid communication with the organ adapter and electrodes on the lung.

FIG. 16 shows an example of an organ transport system 1600 with a component 1622 in fluid communication with the organ adapter 1608 and electrodes 1624 on the lung.

The component 1622 can be a sensor configured to measure the concentration of a gas. The component 1622 can be in fluid communication with the organ adapter 1608 via a tube 1620, for example a branching tube.

The lung can have its own oxygen supply during static hypothermic preservation. Lowering the temperature of the lung can reduce metabolic activity, but may not cease all metabolic activity or gas exchange. Lungs preserved with air may continue to exchange gas and metabolize oxygen. Current devices in the field do not measure or replenish oxygen concentration during hypothermic static storage. The organ storage system can measure oxygen concentration within the lung during preservation and/or ex vivo transport. The organ transport system 1600, or organ preservation system, can replenish oxygen concentration within the lung during preservation and/or ex vivo transport.

The organ transport system 1600 can measure gas concentration within the lung and/or in the organ transport system 1600 to assess lung viability. In some implementations, the organ transport system 1600 can measure oxygen and/or carbon dioxide within the lung and/or in the transport container to assess lung viability. In some implementations, the organ transport system 1600 can measure nitrogen, argon, neon, helium, methane, krypton, hydrogen, nitrous oxide, carbon monoxide, xenon, ozone, nitrogen dioxide, iodine, and/or ammonia within the lung and/or in the transport container to assess lung viability. The organ transport system 1600 can introduce air with a higher oxygen concentration into the lung and/or the transport container. The organ transport system 1600 can introduce air to the lung from a gas source using the pump 1604. For example, the system can introduce air with a higher oxygen concentration when the oxygen concentration within the lung and/or in the transport container are below a threshold. In some implementations, the organ transport system 1600 can introduce oxygen into the lung and/or the transport container. In some embodiments, the system can measure or determine the oxygen consumption of the lung. For example, oxygen consumption can be determined based on the change in oxygen concentration. In some embodiments, oxygen consumption can be determined based on the change in oxygen concentration and the amount of oxygen delivered to the lung and/or exhausted from the lung. In some embodiments, the system can use oxygen consumption to determine organ viability. A higher oxygen consumption can be an indicator of better organ viability.

The organ transport system 1600 can introduce air with a higher oxygen concentration into the lung and/or the transport container when the oxygen concentration within the lung and/or the transport container is below a threshold of 20%. In some embodiments, organ transport system 1600 can introduce air with a higher oxygen concentration into the lung and/or the transport container when the oxygen concentration within the lung and/or the transport container is below a threshold of 10%-30%. In some embodiments, organ transport system 1600 can introduce air with a higher oxygen concentration into the lung and/or the transport container when the oxygen concentration within the lung and/or the transport container is below a threshold of 5%-50%. In some embodiments, a user can set the threshold for the organ transport system 1600.

The organ transport system 1600 can introduce air with a higher oxygen concentration into the lung and/or the transport container when the carbon dioxide concentration within the lung and/or the transport container is above a threshold of 0.035%. In some embodiments, organ transport system 1600 can introduce air with a higher oxygen concentration into the lung and/or the transport container when the carbon dioxide concentration within the lung and/or the transport container is above a threshold of 0.01%-1%. In some embodiments, organ transport system 1600 can introduce air with a higher oxygen concentration into the lung and/or the transport container when the carbon dioxide concentration within the lung and/or the transport container is above a threshold of 0.001%-10%.

Sensors can be positioned on or near the airway of the lung, for example on the component 1622. The sensors can determine air concentration in the airway of the lung during hypothermic preservation. The sensors can include electrochemical sensors, optical sensors, pulse oximeters, capnography sensors, gas analyzers, spirometers, oxygen sensors, and/or carbon dioxide sensors. In some embodiments, the system can sample a gas concentration of the air in the trachea. In some embodiments, the system can sample a gas concentration of the air in one or more lobes of the lung. The system can sample a gas concentration of the air in the right upper lobe, the right middle lobe, and/or the right lower lobe of the lung. The system can sample a gas concentration of the air in the left upper lobe and/or the left lower lobe of the lung. In some embodiments, the system can sample a gas concentration of the air in the left upper lobe and the right upper lobe. In some embodiments, the system can sample a gas concentration of the air in the left lower lobe and the right lower lobe. The lungs can be stored in preservation solution. In some embodiments, the system can sample or measure an oxygen and/or carbon dioxide concentration of the preservation solution. The system can determine a viability of the lung for transplantation based on the gas concentration. The system can communicate the viability of the lung for transplantation to a user device. The system can display the viability of the lung for transplantation. In some embodiments, the system can include a flow sensor, for example on or near the airway of the lung. In some embodiments, the flow sensor can be in the lung adapter or in fluid communication with the lung adapter. The flow sensor can measure the flow of gas into and out of the airway of the lung. The flow sensor can measure the flow of gas delivered from the pump.

Compliance of donor lungs may change during preservation as a function of temperature and/or metabolite concentration in tissue. The organ transport system 1600 can measure the compliance of the lung during preservation and/or ex vivo transport. The organ transport system 1600 can adjust the compliance of the lung during preservation and/or ex vivo transport. Advantageously, determining the compliance and/or impedance of the lung during hypothermic preservation can predict the functionality of the lung after transplantation.

The organ transport system 1600 can measure lung compliance through impedance measurement. The impedance of the lung may change based on the gas concentration in the lung. The impedance of the lung can be measured using electrical impedance tomography. The organ transport system 1600 can include electrodes 1624 placed around the lung to measure impedance. The electrodes 1624 can be placed evenly around the lung. An electrical current can be applied to the lung using the electrodes 1624. The distribution of the electrical current can be affected by air content and tissue density of the lung. The electrodes 1624 can measure the voltage at different points on the lung. The voltage can be used to determine the impedance of the lung.

The organ transport system 1600 can provide a therapeutic effect through targeted airway management. In some embodiments, the organ transport system 1600 can provide a therapeutic effect through static airway management. In some embodiments, the organ transport system 1600 can provide a therapeutic effect through dynamic airway management.

The organ transport system 1600 can deliver oxygen to the lung to target a specific oxygen concentration. In some embodiments, the targeted oxygen concentration can be 20%. In some embodiments, the targeted oxygen concentration can be 10%-30%. In some embodiments, the targeted oxygen concentration can be 5%-50%. The organ transport system 1600 can remove carbon dioxide from the lung to target a specific carbon dioxide concentration. In some examples, removing carbon dioxide can include drawing gas from the lung through a filter that prevents oxygen from passing. In some examples, removing carbon dioxide can include drawing gas from the lung through a filter that absorbs carbon dioxide. In some examples, the organ adapter 1608 or pump 1604 can include multiple lumens. In some examples, removing carbon dioxide can be performed using electrolysis, carbon dioxide capture, or chromatography. One or more of the multiple lumens can include filters for removing contaminants or different gases. In some examples, removing carbon dioxide can include drawing gas from the lung including both carbon dioxide and oxygen. In some embodiments, the targeted carbon dioxide concentration can be 0.035%. In some embodiments, the targeted carbon dioxide concentration can be 0.01%-1%. In some embodiments, the targeted carbon dioxide concentration can be 0.001%-10%. The organ transport system 1600 can deliver nitric oxide to the lung.

The organ transport system 1600 can include airway tubing in fluid communication with an airway of the lung. The airway tubing can be in fluid communication with the airway of the lung via an organ adapter 1608, or lung adapter. The organ transport system 1600 can include branching ports in the tube 1620. The branching ports in the airway tubing can allow for bronchoscopic visualization. For example, the tube 1620 can include a bronchoscopy component 1622. The branching ports in the airway tubing can allow for suction and/or removal of mucus secretion. For example, the tube 1620 can include a mucus removal component 1622. The branching ports in the airway tubing can allow for diagnostic and/or therapeutic agents. For example, the tube 1620 can include a delivery component 1622. Diagnostic agents delivered via the airway tubing can include contrast agents, fluorescent dyes, radioactive tracers, stains, fluorescent probes, liposomal agents, microbubble contrast agents, nanoparticles, gases such as helium or xenon, and/or enzyme substrates. Therapeutic agents delivered via the airway tubing can include bronchodilators, corticosteroids, mucolytics, antibiotics, antiviral agents, anti-inflammatory agents, surfactant preparations, immunomodulators, and/or oxygen-enriched solutions.

The organ transport system 1600 can inflate and deflate the lung intermittently. The organ transport system 1600 can measure dynamic and/or static compliance of the lung during inflation, deflation, and/or intermittent inflation and deflation. The organ transport system 1600 can measure changes in oxygen concentration in the lung tissue. The organ transport system 1600 can measure gas concentration in the lung over time. The organ transport system 1600 can determine lung viability based on changes in gas concentration during preservation. Advantageously, determining the gas concentration in the lung during hypothermic preservation can predict the functionality of the lung after transplantation.

The organ transport system 1600 can intermittently pump air into the organ. The organ transport system 1600 can release air from the organ and reintroduce the air to the lungs. In some embodiments, reintroduction of air to the lungs can replenish the oxygen concentration of the lung. In some embodiments, reintroduction of air to the lungs can maintain or promote a level of lung compliance. In some embodiments, reintroduction of air to the lungs can recruit lobes that may have been difficult or not possible to recruit during procurement. Recruiting a lobe of the lung can mean expanding or opening the lobe.

The pump 1604 of the organ transport system 1600 can be turned on and off. The frequency of turning the pump 1604 on and off can be adjusted to achieve target oxygen concentrations. The frequency of turning the pump 1604 on and off can be adjusted to achieve target carbon dioxide concentrations.

The organ transport system 1600 can cyclically inflate and deflate the lung. The organ transport system 1600 can pump oxygen or oxygen-rich air into the lung to inflate the lung. The organ transport system 1600 can remove carbon dioxide or carbon dioxide-rich air from the lung to deflate the lung.

In some embodiments, the temperature of storage of the lung in the organ transport system 1600 can be based on an oxygen consumption rate. In some embodiments, the temperature in the organ transport system 1600 can be higher when the oxygen consumption rate is higher. In some embodiments, the temperature in the organ transport system 1600 can be lower when the oxygen consumption rate is lower. In some embodiments, the temperature of storage of the lung in the organ transport system 1600 can be based on an oxygen concentration or percentage. In some embodiments, the temperature in the organ transport system 1600 can be higher when the oxygen concentration or percentage is higher. In some embodiments, the temperature in the organ transport system 1600 can be lower when the oxygen concentration or percentage is lower. Temperature in the organ transport system 1600 can be adjusted by changing the cooling materials and/or the position of the cooling materials. Temperature in the organ transport system 1600 can be adjusted with an electronic heating element and/or an electronic cooling element.

Figure 17:
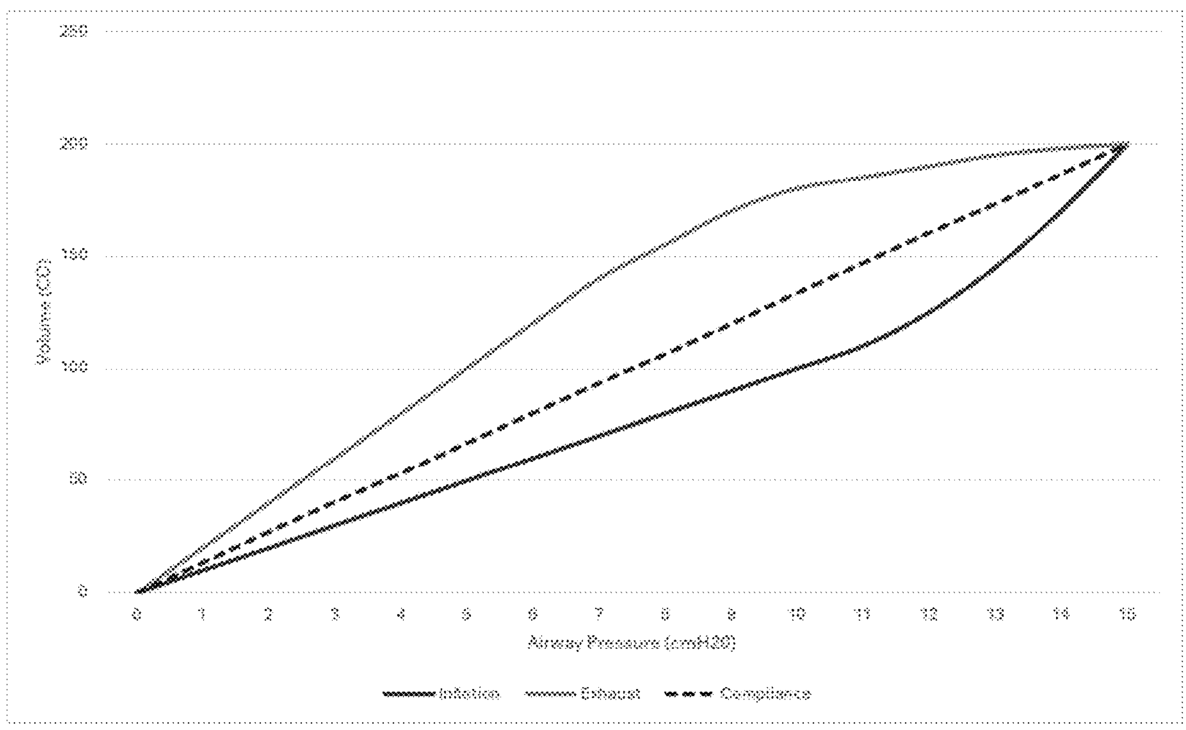
FIG. 17 shows a graph of lung compliance based on measures of pressure and volume in the lung.

FIG. 17 shows a graph of lung compliance based on measures of pressure and volume in the lung.

In some embodiments, the organ transport system described herein can measure or calculate compliance of the lung. Compliance can be used to determine lung viability for transplantation. Compliance in the lung can be used to determine how much gas should be pumped into the lung or released from the lung. Compliance in the lung can be measured during hypothermic preservation using a pressure sensor and/or a flow sensor, for example in a lung adapter.

Lung compliance can be determined by measuring the volume of air introduced to lung to increase the airway pressure. The initial volume of the lung can be known such that flow rate into and/or out of the lung can be used to determine the volume of the lung. A more compliant lung will have pressure decrease less based on an increase in volume than a less compliant lung with the same increase in volume. A lung with compliance too high can be less able to expand and therefore less viable. A lung with compliance too low can expand too much or have leaks or holes, and therefore less viable. In some examples, a viable lung can have a compliance of 150-200 CC/15 cmH2O. In some examples, a viable lung can have a compliance of 100-250 CC/15 cmH2O.

In some implementations, lung compliance can be determined by measuring the volume of air to increase airway pressure from 0 to 15 cmH2O. In some implementations, lung compliance can be determined by measuring the volume of air to increase airway pressure from a lowpoint between 0 cmH2O and 14 cmH2O and a high point of between 1 cmH2O and 15 cmH2O. In some implementations, lung compliance can be determined by measuring the volume of air to increase airway pressure from a lowpoint between 0 cmH2O and 29 cmH2O and a high point of between 1 cmH2O and 30 cmH2O. In some implementations, compliance can be determined by measuring the volume exhausted between two pressures. In some implementations, compliance can be measured with a flow sensor or with a flowrate through the pump. With a fixed flowrate through the pump, a processor or user can measure compliance as change in pressure over time.

At an airway pressure of approximately 0 cmH2O, the volume of the lung can have a volume of approximately 0 CC during exhaust and approximately 0 CC during inflation. At an airway pressure of approximately 5 cmH2O, the volume of the lung can have a volume of approximately 50 CC during exhaust and approximately 100 CC during inflation. At an airway pressure of approximately 10 cmH2O, the volume of the lung can have a volume of approximately 100 CC during exhaust and approximately 180 CC during inflation. At an airway pressure of approximately 15 cmH2O, the volume of the lung can have a volume of approximately 200 CC during exhaust and approximately 200 CC during inflation. The compliance of the lung measured in the graph of FIG. 17 can be determined to be 200 CC/15 cmH2O.

The systems described herein can pump gas in at a flowrate based on the determined compliance of the lung. The systems described herein can determine a lung is viable if the compliance of the lung is over an upper threshold and/or below a lower threshold.

Embodiments

Embodiment 1. A system for maintaining organ pressure, the system comprising: an organ adapter configured to seal with a lumen of an organ; a manifold in fluid communication with the organ adapter; an electronic pump configured to pump gas to the manifold; and a pressure regulator in fluid communication with the manifold, the pressure regulator configured to release gas from the manifold at a gas release rate, wherein the pressure regulator is configured to increase the gas release rate when organ pressure is above a high pressure threshold, and wherein the pressure regulator is configured to decrease the gas release rate when organ pressure is below a low pressure threshold.

Embodiment 2. The system of embodiment 1, wherein the organ is a lung and the lumen of the organ is selected from the group consisting of a trachea or bronchus of the lung.

Embodiment 3. The system of any one of embodiments 1-2, further comprising one or more containers operable to receive the organ and form a sealed environment around the organ, the one or more containers comprising a connector to facilitate fluid communication between the organ adapter within the one or more containers and the manifold external to the one or more containers.

Embodiment 4. The system of embodiment 3, wherein the one or more containers are nested within each other.

Embodiment 5. The system of any one of embodiments 1-4, further comprising one or more sensors configured to measure a parameter of the organ.

Embodiment 6. The system of embodiment 5, wherein the parameter is selected from the group consisting of temperature and pressure.

Embodiment 7. The system of any one of embodiments 1-6, further comprising a cooling element.

Embodiment 8. The system of embodiment 7, wherein the cooling element is configured to cool gas traveling to the lumen of the organ.

Embodiment 9. The system of any one of embodiments 1-8, further comprising a humidifying element configured to humidify gas traveling to the lumen of the organ.

Embodiment 10. The system of any one of embodiments 1-9, further comprising a compressive sleeve operable to compress the organ.

Embodiment 11. The system of embodiment 3, further comprising one or more pouches of phase change material (PCM) for surrounding and cooling the one or more containers.

Embodiment 12. The system of any one of embodiments 1-11, wherein the electronic pump pumps gas into the manifold at a constant rate.

Embodiment 13. The system of any one of embodiments 1-12, further comprising a pressure sensor configured to measure organ pressure.

Embodiment 14. The system of any one of embodiments 1-13, wherein the electronic pump is configured to pump gas from an organ chamber to the manifold.

Embodiment 15. The system of any one of embodiments 1-14, wherein the high pressure threshold is 15 cmH2O.

Embodiment 16. The system of any one of embodiments 1-15, wherein the low pressure threshold is 10 cmH2O.

Embodiment 17. The system of any one of embodiments 1-16, wherein the low pressure threshold is 12 cmH2O.

Embodiment 18. The system of any one of embodiments 1-17, further comprising an outer container configured to be removed without disconnecting the organ adapter.

Embodiment 19. The system of any one of embodiments 1-18, further comprising a suspension mechanism to suspend the organ upright.

Embodiment 20. The system of embodiment 11, wherein the phase change material (PCM) is engineered to have a temperature between 2-10° C.

Embodiment 21. The system of embodiment 11, wherein the phase change material (PCM) is arranged in recesses.

Embodiment 22. The system of any one of embodiments 1-21, further comprising a pressure management module.

Embodiment 23. The system of any one of embodiments 1-22, wherein the electronic pump is configured to pump gas from an external environment to the manifold.

Embodiment 24. The system of any one of embodiments 1-23, wherein the pressure regulator is configured to pump gas to an external environment from the manifold.

Embodiment 25. The system of any one of embodiments 1-24, wherein the pressure regulator is configured to pump gas to an organ chamber from the manifold.

Embodiment 26. The system of embodiment 5, further comprising a datalogger configured to log information from the one or more sensors.

Embodiment 27. The system of any one of embodiments 5 and 26, further comprising an alarm when the parameter is above or below a threshold.

Embodiment 28. The system of any one of embodiments 1-27, further comprising a battery pack configured to charge the electronic pump.

Embodiment 29. The system of any one of embodiments 1-28, further comprising a sterilizing filter.

Embodiment 30. The system of any one of embodiments 1-29, wherein the electronic pump is configured to be controlled by a user.

Embodiment 31. A method for maintaining organ pressure, the method comprising: providing an organ transport container comprising an organ adapter, a pressure regulator, and a manifold, wherein the manifold is in fluid communication with the pressure regulator and the organ adapter; sealing the organ adapter to a lumen of an organ; pumping, using an electronic pump, gas to the manifold; releasing, using the pressure regulator, gas from the manifold at a gas release rate; increasing, using the pressure regulator, a gas release rate when organ pressure is above a high pressure threshold, and decreasing, using the pressure regulator, the gas release rate when organ pressure is below a low pressure threshold.

Embodiment 32. The method of embodiment 31, wherein the organ is a lung and the lumen of the organ is selected from the group consisting of a trachea or bronchus of the lung.

Embodiment 33. The method of any one of embodiments 31-32, further comprising receiving the organ in one or more containers and forming a sealed environment around the organ, the one or more containers comprising a connector to facilitate fluid communication between the organ adapter within the one or more containers and the manifold external to the one or more containers.

Embodiment 34. The method of embodiment 33, wherein the one or more containers are nested within each other.

Embodiment 35. The method of any one of embodiments 31-34, further comprising measuring a parameter of the organ using one or more sensors.

Embodiment 36. The method of embodiment 35, wherein the parameter is selected from the group consisting of temperature and pressure.

Embodiment 37. The method of any one of embodiments 31-36, further comprising cooling the organ using a cooling element.

Embodiment 38. The method of embodiment 37, wherein the cooling element is configured to cool gas traveling to the lumen of the organ.

Embodiment 39. The method of any one of embodiments 31-38, further comprising humidifying gas traveling to the lumen of the organ using a humidifying element.

Embodiment 40. The method of any one of embodiments 31-39, further comprising compressing the organ using a compressive sleeve.

Embodiment 41. The method of embodiment 33, further comprising surrounding and cooling the one or more containers using one or more pouches of phase change material (PCM).

Embodiment 42. The method of any one of embodiments 31-41, wherein the electronic pump pumps gas into the manifold at a constant rate.

Embodiment 43. The method of any one of embodiments 31-42, further comprising measuring organ pressure using a pressure sensor.

Embodiment 44. The method of any one of embodiments 31-43, wherein the electronic pump is configured to pump gas from an organ chamber to the manifold.

Embodiment 45. The method of any one of embodiments 31-44, wherein the high pressure threshold is 15 cmH2O.

Embodiment 46. The method of any one of embodiments 31-45, wherein the low pressure threshold is 10 cmH2O.

Embodiment 47. The method of any one of embodiments 31-46, wherein the low pressure threshold is 12 cmH2O.

Embodiment 48. The method of any one of embodiments 31-47, further comprising removing an outer container without disconnecting the organ adapter.

Embodiment 49. The method of any one of embodiments 31-48, further comprising suspending the organ upright using a suspension mechanism.

Embodiment 50. The method of embodiment 41, wherein the phase change material (PCM) is engineered to have a temperature between 2-10° C.

Embodiment 51. The method of embodiment 41, wherein the phase change material (PCM) is arranged in recesses.

Embodiment 52. The method of any one of embodiments 31-51, wherein the organ transport container further comprises a pressure management module.

Embodiment 53. The method of any one of embodiments 31-52, wherein the electronic pump is configured to pump gas from an external environment to the manifold.

Embodiment 54. The method of any one of embodiments 31-53, wherein the pressure regulator is configured to pump gas to an external environment from the manifold.

Embodiment 55. The method of any one of embodiments 31-54, wherein the pressure regulator is configured to pump gas to an organ chamber from the manifold.

Embodiment 56. The method of embodiment 35, further comprising logging information from the one or more sensors with a datalogger.

Embodiment 57. The method of any one of embodiments 35 and 56, further comprising activating an alarm when the parameter is above or below a threshold.

Embodiment 58. The method of any one of embodiments 31-57, further comprising charging the electronic pump using a battery pack.

Embodiment 59. The method of any one of embodiments 31-58, further comprising filtering the gas using a sterilizing filter.

Embodiment 60. The method of any one of embodiments 31-59, wherein the electronic pump is configured to be controlled by a user.

Embodiment 61. A system for preserving a lung, the system comprising: a transport container configured to receive a lung; a lung adapter configured to seal with an airway of the lung; one or more sensors configured to measure a gas concentration in the lung; a gas source configured to be in fluid communication with the lung adapter; and a pump configured to pump gas from the gas source to the lung adapter and the airway of the lung.

Embodiment 62. The system of embodiment 61, wherein the one or more sensors are configured to measure an oxygen concentration.

Embodiment 63. The system of embodiment 62, wherein the pump is configured to pump oxygen to the airway of the lung when the oxygen concentration is below an oxygen threshold.

Embodiment 64. The system of embodiment 63, wherein the oxygen threshold is 20%.

Embodiment 65. The system of any one of embodiments 61-64, wherein the one or more sensors are configured to measure a carbon dioxide concentration.

Embodiment 66. The system of embodiment 65, wherein the pump is configured to pump oxygen to the airway of the lung when the carbon dioxide concentration is above a carbon dioxide threshold.

Embodiment 67. The system of any one of embodiment 65 or 66, wherein the pump is configured to remove carbon dioxide from the airway of the lung when the carbon dioxide concentration is above a carbon dioxide threshold.

Embodiment 68. The system of any one of embodiments 66 or 67, wherein the carbon dioxide threshold is 1%.

Embodiment 69. The system of any one of embodiments 61-68, further comprising a port connected to the lung adapter comprising a bronchoscopy component.

Embodiment 70. The system of any one of embodiments 61-69, further comprising a port connected to the lung adapter comprising a mucus removal component configured to remove mucus secretion from the airway of the lung.

Embodiment 71. The system of any one of embodiments 61-70, further comprising a port connected to the lung adapter comprising a delivery component configured to deliver at least one diagnostic agent to the airway of the lung.

Embodiment 72. The system of any one of embodiments 61-71, further comprising a port connected to the lung adapter comprising a delivery component configured to deliver at least one therapeutic agent to the airway of the lung.

Embodiment 73. The system of any one of embodiments 61-72, wherein the pump is configured to deliver nitric oxide to the airway of the lung.

Embodiment 74. The system of any one of embodiments 61-73, wherein the one or more sensors is configured to sample a gas concentration in a trachea of the lung.

Embodiment 75. The system of any one of embodiments 61-74, wherein the one or more sensors is configured to sample a gas concentration in one or more lobes of the lung.

Embodiment 76. The system of any one of embodiments 61-75, wherein the one or more sensors is configured to sample a gas concentration in preservation solution in the transport container.

Embodiment 77. The system of any one of embodiments 61-76, further comprising cooling material disposed in the transport container.

Embodiment 78. A method for preserving a lung, the method comprising: providing a transport container configured to receive a lung; sealing an airway of the lung to a lung adapter of the transport container; measuring, using one or more sensors, an oxygen concentration in the lung; and delivering, using a pump, oxygen to the lung through the lung adapter when the oxygen concentration is below an oxygen threshold.

Embodiment 79. The method of embodiment 78, wherein measuring the oxygen concentration of the lung comprises measuring the oxygen concentration of the lung at multiple points in time during preservation of the lung.

Embodiment 80. The method of any one of embodiments 78 or 79, wherein the oxygen threshold is 20%.

Embodiment 81. The method of any one of embodiments 78 or 79, further comprising inputting the oxygen threshold.

Embodiment 82. A method for preserving a lung, the method comprising: providing a transport container configured to receive a lung; sealing an airway of the lung to a lung adapter of the transport container; measuring, using one or more sensors, a carbon dioxide concentration in the lung; and removing, using a pump, carbon dioxide from the lung through the lung adapter when the carbon dioxide concentration is above a carbon dioxide threshold.

Embodiment 83. The method of embodiment 82, wherein measuring the carbon dioxide concentration of the lung comprises measuring the carbon dioxide concentration of the lung at multiple points in time during preservation of the lung.

Embodiment 84. The method of any one of embodiments 82 or 83, wherein the carbon dioxide threshold is 1%.

Embodiment 85. The method of any one of embodiments 82 or 83, further comprising inputting the carbon dioxide threshold.

Embodiment 86. A method for determining viability of a lung, the method comprising: providing a transport container configured to receive a lung; sealing an airway of the lung to a lung adapter of the transport container; measuring, using one or more sensors, an oxygen concentration in the lung during hypothermic preservation; and determining viability of the lung for transplantation based on the oxygen concentration in the lung.

Embodiment 87. The method of embodiment 86, wherein measuring the oxygen concentration of the lung comprises measuring the oxygen concentration of the lung at multiple points in time during preservation of the lung.

Embodiment 88. The method of embodiment 87, further comprising determining viability of the lung for transplantation based on a change in oxygen concentration during preservation of the lung.

Embodiment 89. A method for determining viability of a lung, the method comprising: placing a lung in a transport container; delivering, using one or more electrodes, electricity to the lung; measuring, using the one or more electrodes, voltage of the lung during hypothermic preservation; determining impedance of the lung based on the voltage of the lung; and determining viability of the lung for transplantation based on the impedance of the lung.

Embodiment 90. The method of embodiment 89, wherein determining the impedance of the lung comprises determining the impedance of the lung at multiple points in time during preservation of the lung.

Embodiment 91. The method of embodiment 90, further comprising determining viability of the lung for transplantation based on a change in impedance during preservation of the lung.

Embodiment 92. A method for preserving a lung, the method comprising: providing a transport container configured to receive a lung; sealing an airway of the lung to a lung adapter of the transport container; delivering, with a pump, gas comprising oxygen into the lung through the lung adapter to inflate the lung; and removing, with the pump, gas comprising carbon dioxide from the lung through the lung adapter to deflate the lung, wherein the pump is configured to cyclically inflate and deflate the lung during preservation.

Embodiment 93. A system for preserving a lung, the system comprising: a transport container configured to receive a lung; a lung adapter configured to seal to an airway of the lung; a gas source containing gas comprising oxygen; a pump configured to deliver the gas comprising oxygen from the gas source to the lung through the lung adapter to inflate the lung; and the pump configured to remove gas comprising carbon dioxide from the lung through the lung adapter to deflate the lung, wherein the pump is configured to cyclically inflate and deflate the lung during preservation.

Embodiment 94. A method for determining viability of a lung, the method comprising: placing a lung in a transport container; delivering, using one or more electrodes, electricity to the lung; measuring, using the one or more electrodes, voltage of the lung during hypothermic preservation; determining impedance of the lung based on the voltage of the lung; and pumping oxygen into the lung when the impedance of the lung is above a threshold.

Embodiment 95. A method for determining viability of a lung, the method comprising: providing a transport container configured to receive a lung; sealing an airway of the lung to a lung adapter of the transport container; measuring, using one or more sensors, a first volume in the lung during hypothermic preservation; measuring, using one or more sensors, a first airway pressure of the lung during hypothermic preservation; delivering gas to the airway of the lung or removing gas from the airway of the lung; measuring, using one or more sensors, a second volume in the lung during hypothermic preservation; measuring, using one or more sensors, a second airway pressure of the lung during hypothermic preservation; based on the difference between the first volume and the second volume in the lung and the difference between the first airway pressure and the second airway pressure of the lung, determining a compliance of the lung; and determining viability of the lung for transplantation based on the compliance of the lung.

Embodiment 96. A method for determining viability of a lung, the method comprising: providing a transport container configured to receive a lung; sealing an airway of the lung to a lung adapter of the transport container; measuring, using one or more sensors, a first volume in the lung during hypothermic preservation; measuring, using one or more sensors, a first airway pressure of the lung during hypothermic preservation; delivering gas to the airway of the lung or removing gas from the airway of the lung; measuring, using one or more sensors, a second volume in the lung during hypothermic preservation; measuring, using one or more sensors, a second airway pressure of the lung during hypothermic preservation; based on the difference between the first volume and the second volume in the lung and the difference between the first airway pressure and the second airway pressure of the lung, determining a compliance of the lung; and delivering oxygen into the lung when the compliance of the lung is above a threshold.

Embodiment 97. A method for determining viability of a lung, the method comprising: providing a transport container configured to receive a lung; sealing an airway of the lung to a lung adapter of the transport container; measuring an oxygen consumption rate of the lung; and changing a temperature in the transport container based on the oxygen consumption rate of the lung.

Embodiment 98. A method for determining viability of a lung, the method comprising: providing a transport container configured to receive a lung; sealing an airway of the lung to a lung adapter of the transport container; measuring an oxygen concentration in the lung; and changing a temperature in the transport container based on the oxygen concentration in the lung.

Implementation Consideration

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A system for maintaining organ pressure, the system comprising:

an organ adapter configured to seal with a lumen of an organ;

a manifold in fluid communication with the organ adapter, the manifold configured to receive gas from a gas source; and a pressure regulator in fluid communication with the manifold, the pressure regulator configured to release gas from the manifold at a gas release rate based on changes in environmental pressure, wherein the manifold and the pressure regulator are configured to maintain a gas pressure within the organ in a desired range when the manifold receives gas at a substantially constant rate and the environmental pressure is above or below the desired range.

2. The system of claim 1, wherein the organ is a lung and the lumen of the organ is selected from a group consisting of a trachea or bronchus of the lung.

3. The system of claim 1, further comprising one or more containers operable to receive the organ and form a sealed environment around the organ, the one or more containers comprising a connector to facilitate fluid communication between the organ adapter within the one or more containers and the manifold external to the one or more containers.

4. The system of claim 1, further comprising one or more sensors configured to measure a parameter of the organ, wherein the parameter is selected from the group consisting of temperature and pressure.

5. The system of claim 1, further comprising an electronic pump configured to pump gas into the manifold at a constant rate.

6. The system of claim 5, wherein the electronic pump is configured to pump gas from an organ chamber to the manifold.

7. The system of claim 5, wherein the electronic pump is configured to pump gas from an external environment to the manifold.

8. The system of claim 1, wherein the pressure regulator is configured such that the gas release rate increases when a pressure of the organ is at or above 15cm$H_2O$.

9. The system of claim 1, wherein the pressure regulator is configured such that the gas release rate decreases when a pressure of the organ is at or below 10cm$H_2O$.

10. The system of claim 1, wherein the pressure regulator is configured to release gas to an external environment or an organ chamber from the manifold.

11. The system of claim 1, wherein the changes in the environmental pressure are at least partially based on changes in altitude.

12. A method for maintaining organ pressure, the method comprising:

preserving an organ in an organ transport container comprising an organ adapter, a pressure regulator, and a manifold, wherein the manifold is in fluid communication with the pressure regulator and the organ adapter, wherein the organ adapter is sealed with a lumen of the organ, wherein the manifold is configured to receive gas from a gas source;

via the pressure regulator, releasing gas from the manifold at a gas release rate based on changes in environmental pressure to maintain a gas pressure within the organ in a desired range when the manifold receives gas at a substantially constant rate and the environmental pressure is above or below the desired range.

13. The method of claim 12, wherein the organ is a lung and the lumen of the organ is selected from a group consisting of a trachea or bronchus of the lung.

14. The method of claim 12, further comprising receiving the organ in one or more containers and forming a sealed environment around the organ, the one or more containers comprising a connector to facilitate fluid communication between the organ adapter within the one or more containers and the manifold external to the one or more containers.

15. The method of claim 12, further comprising measuring a parameter of the organ using a sensor, wherein the parameter is selected from the group consisting of temperature and pressure.

16. The method of claim 12, further comprising an electronic pump pumps gas into the manifold at a constant rate.

17. The method of claim 12, further comprising releasing gas at an increased gas release rate when a pressure of the organ is at or above 15cm$H_2O$.

18. The method of claim 12, further comprising releasing gas at a decreased gas release rate when a pressure of the organ is at or below 10cm$H_2O$.

19. The method of claim 12, wherein the pressure regulator is configured to release gas to an external environment from the manifold.

20. The method of claim 12, wherein the changes in the environmental pressure are at least partially based on changes in altitude.

* * * * *